US011683422B2

(12) United States Patent
Yamazaki

(10) Patent No.: US 11,683,422 B2
(45) Date of Patent: Jun. 20, 2023

(54) IMAGE PROCESSING SYSTEM, IMAGE PROCESSING APPARATUS, AND IMAGE PROCESSING METHOD

(71) Applicant: CANON KABUSHIKI KAISHA, Tokyo (JP)

(72) Inventor: Katsuyuki Yamazaki, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/112,426

(22) Filed: Dec. 4, 2020

(65) Prior Publication Data

US 2021/0176371 A1 Jun. 10, 2021

(30) Foreign Application Priority Data

Dec. 10, 2019 (JP) .............................. JP2019-223303

(51) Int. Cl.
*H04N 1/00* (2006.01)
*G10L 15/26* (2006.01)

(52) U.S. Cl.
CPC ......... *H04N 1/00403* (2013.01); *G10L 15/26* (2013.01); *H04N 1/00408* (2013.01); *H04N 1/00488* (2013.01); *H04N 2201/0094* (2013.01)

(58) Field of Classification Search
USPC ........... 358/1.1–3.29, 1.11–1.18; 399/75–82; 704/1–10, 200–274; 715/700–748
See application file for complete search history.

(56) References Cited

U.S. PATENT DOCUMENTS

| 10,855,856 B2* | 12/2020 | Sugawara .......... H04N 1/00472 |
| 2019/0206389 A1* | 7/2019 | Kwon ..................... G10L 15/07 |
| 2020/0175984 A1* | 6/2020 | Iwasa ...................... G10L 15/22 |
| 2020/0177744 A1* | 6/2020 | Yoshimi ............... H04N 1/0048 |
| 2020/0177747 A1* | 6/2020 | Yasuda .............. H04N 1/00403 |
| 2021/0090571 A1* | 3/2021 | Yang ....................... G10L 15/22 |

FOREIGN PATENT DOCUMENTS

| JP | 2004013094 A | 1/2004 |
| JP | 2018173754 A | 11/2018 |
| JP | 2019067258 A | 4/2019 |
| JP | 2019074608 A | 5/2019 |

* cited by examiner

*Primary Examiner* — Marcellus J Augustin
(74) *Attorney, Agent, or Firm* — Canon U.S.A., Inc. IP Division

(57) ABSTRACT

An image processing system includes an image processing device configured to process an image, a microphone configured to acquire sound, a display configured to display information, and one or more controllers. The one or more controllers are configured to function as a unit configured to acquire text information based on voice information acquired via the microphone, and a unit configured to cause the image processing device to execute image processing in response to an execution command being acquired from the text information, and to cause the display to display, in response to an execution command related to the image processing being not acquired from the text information and a setting command related to the image processing being acquired, a screen for waiting for an execution instruction to execute image processing that is based on at least the setting command.

19 Claims, 33 Drawing Sheets

FIG.8A

| Entity ID | Value ID | Value(REPRESENTATIVE WORDS) Synonyms(SYNONYMOUS WORDS) |
|---|---|---|
| FREE_WORD (SYSTEM RECOGNIZES OPTIONAL PHRASE AND RETURN RECOGNIZED PHRASE) | | |
| NUMBER (REPLACE WORD INDICATING NUMBER BY ALPHABETICAL CHARACTERS) | | ZERO<br>ONE<br>TWO<br>THREE<br>FOUR<br>...... |
| Quantity | on_00000 | ALL |
| | on_00001 | ONE<br>1 |
| | on_00002 | TWO<br>2 |
| | on_00003 | THREE<br>3 |
| | on_00004 | FOUR<br>4 |
| | on_00005 | FIVE<br>5 |
| | on_00006 | SIX<br>6 |
| | on_00007 | SEVEN<br>7 |
| | on_00008 | EIGHT<br>8 |
| | on_00008 | NINE<br>9 |
| | on_00010 | TEN<br>10 |
| OneAlphabet | chr_00000 | a<br>A |
| | chr_00001 | b<br>B |
| | chr_00002 | c<br>C |
| | chr_00003 | d<br>D |
| | chr_00004 | e<br>E |
| | chr_00005 | f<br>F |
| | chr_00006 | g<br>G |
| | chr_00007 | h<br>H |
| | chr_00008 | i<br>I |
| | ⋮ | ⋮ |
| | chr_00025 | z<br>Z |

FIG.8B

| Entity ID | Value ID | Value(REPRESENTATIVE WORDS) Synonyms(SYNONYMOUS WORDS) |
|---|---|---|
| Color | col_00000 | RED<br>  RED COLOR<br>  DEEP RED<br>  SCARLET |
| | col_00001 | GREEN<br>  GREEN COLOR |
| | col_00002 | BLUE<br>  BLUE COLOR<br>  SKY BLUE |
| | col_00003 | YELLOW<br>  YELLOW COLOR |
| | col_00004 | MAGENTA<br>  RED PURPLE COLOR |
| | col_00005 | CYAN<br>  DEEP BLUE COLOR |
| | col_00006 | BLACK<br>  BLACK COLOR |
| | col_00007 | GRAY<br>  GREY |
| ColorMode | cm_00000 | GRAY SCALE<br>  MULTIVALUED BLACK AND WHITE |
| | cm_00001 | BLACK AND WHITE<br>  BW<br>  MONOCHROME |
| | cm_00002 | BINARY BLACK AND WHITE<br>  BINARY BLACK AND WHITE<br>  TWO-VALUED BLACK AND WHITE |
| | cm_00003 | MONOCOLOR<br>  SINGLE COLOR |
| | cm_00004 | TWO-COLOR<br>  BICOLOR |
| | cm_00005 | FULL COLOR |

FIG.8C

| Entity ID | Value ID | Value(REPRESENTATIVE WORDS) Synonyms(SYNONYMOUS WORDS) |
|---|---|---|
| CopyOperation (COPY INSTRUCTION) | copy_00000 | COPY<br>  COPIES<br>  DUPLICATE<br>  REPRODUCTION |
| PrintOperation (PRINT INSTRUCTION) | print_00000 | PRINT<br>  PRINTS<br>  PRINT OUT |
| ScanOperation (SCAN INSTRUCTION) | scan_00000 | SCAN<br>  READ<br>  READ-IN<br>  TAKE-IN |
| StoreOperation (STORE INSTRUCTION) | store_00000 | SAVE<br>  STORE<br>  RETAIN<br>  RECORD<br>  WRITE<br>  LEAVE<br>  HOLD<br>  STORE |
| SendOperation (SEND INSTRUCTION) | send_00000 | SEND<br>  TRANSMIT<br>  TRANSFER |

FIG.9A

| Entity ID | Value ID | Value(REPRESENTATIVE WORDS) Synonyms(SYNONYMOUS WORDS) |
|---|---|---|
| PaperSize | psize_00000 | A3<br>  A3-SIZE |
| | psize_00001 | A4<br>  A4-SIZE |
| | psize_00002 | A5<br>  A5-SIZE |
| | psize_00003 | B4<br>  B4-SIZE |
| | psize_00004 | B5<br>  B5-SIZE |
| | psize_00010 | LTR<br>  LETTER |
| | psize_00011 | LGL<br>  LEGAL |
| | psize_00012 | FOLIO |
| | psize_00013 | FLSP<br>  FOOLSCAP |
| | psize_00014 | 11x17<br>  LEDGER<br>  TABLOID<br>  ELEVEN BY SEVENTEEN |
| | psize_00015 | EXEC<br>  EXECUTIVE<br>  EXEC |
| | psize_00016 | STMT<br>  STATEMENT |
| | psize_00020 | ELONGATED |
| | psize_00030 | POSTCARD |
| PaperType | ptype_00000 | OHP<br>  TRANSPARENT PAPER<br>  TRANSPARENT FILM |
| | ptype_00001 | PLAIN PAPER |
| | ptype_00002 | RECYCLED PAPER |
| | ptype_00003 | THICK PAPER |
| | ptype_00004 | COATED PAPER<br>  GLOSS PAPER |
| | ptype_00005 | PHOTOGRAPHIC PRINTING PAPER<br>  BROMIDE PAPER<br>  PHOTOGRAPHIC PAPER |
| | ptype_00006 | INDEX PAPER<br>  TAB PAPER |
| | ptype_00007 | MATT COATED PAPER |
| | ptype_00008 | COLORED PAPER |

FIG.9B

| Entity ID | Value ID | Value(REPRESENTATIVE WORDS) Synonyms(SYNONYMOUS WORDS) |
|---|---|---|
| PaperSide (PRINT DOCUMENT ON BOTH SIDES OR ONE SIDE) | pside_00000 | SIMPLEX<br>  ONE-SIDED<br>  ONLY FRONT SURFACE |
| | pside_00001 | DUPLEX<br>  TWO-SIDED<br>  DOUBLE-SIDED |
| | pside_00002 | FRONT AND BACK SURFACES |
| | pside_00003 | BACK AND FRONT SURFACES |
| Position | pos_00000 | TOP<br>  TOP PART<br>  TOP SIDE<br>  UPPER SIDE |
| | pos_00001 | UPPER RIGHT<br>  TOP RIGHT |
| | pos_00002 | RIGHT<br>  RIGHT SIDE |
| | pos_00003 | DOWN RIGHT<br>  RIGHT LOWER |
| | pos_00004 | BOTTOM<br>  BOTTOM PART<br>  UNDERSIDE<br>  LOWER SIDE<br>  BOTTOM SIDE |
| | pos_00005 | BOTTOM LEFT<br>  LEFT LOWER |
| | pos_00006 | LEFT<br>  LEFT SIDE |
| | pos_00007 | UPPER LEFT<br>  TOP LEFT |
| | pos_00008 | CENTER<br>  MIDDLE<br>  CENTER PART |
| | pos_00010 | TOP AND BOTTOM<br>  HIGH AND LOW<br>  ABOVE AND BELOW |
| | pos_00011 | LEFT AND RIGHT<br>  SIDE TO SIDE |
| Direction (PRINTING ORIENTATION) | dir_00000 | VERTICAL |
| | dir_00001 | HORIZONTAL |
| | dir_00010 | SHORT SIDE |
| | dir_00011 | LONG SIDE |
| | dir_00020 | VERTICALLY LONG<br>  PORTRAIT |
| | dir_00021 | HORIZONTALLY LONG<br>  LANDSCAPE |

FIG.10A

| Entity ID | Value ID | Value(REPRESENTATIVE WORDS) Synonyms(SYNONYMOUS WORDS) |
|---|---|---|
| Address_LastName (LAST NAME) | lastname_00000 | SATOU |
| | lastname_00001 | SUZUKI |
| | lastname_00002 | TAKAHASHI |
| | lastname_00003 | TANAKA |
| | lastname_00004 | ITOU |
| | lastname_00005 | WATANABE |
| | lastname_00006 | YAMAMOTO |
| | ⋮ | ⋮ |
| Address_FirstName (FIRST NAME) | firstname_00000 | ICHIROU |
| | firstname_00001 | JIROU |
| | firstname_00002 | SABUROU |
| | firstname_00003 | TAROU |
| | firstname_00004 | HIROSHI |
| | firstname_00005 | YUTAKA |
| | firstname_00006 | HANAKO |
| | firstname_00007 | AI |
| | ⋮ | ⋮ |
| Address_NameTitle (TITLE) | nametitle_00000 | MR. |
| | nametitle_00001 | MS. |
| | nametitle_00002 | MRS. |
| | nametitle_00003 | DIVISION CHIEF |
| | nametitle_00004 | DEPARTMENT CHIEF |
| | nametitle_00005 | SECTION CHIEF |
| | ⋮ | ⋮ |

FIG.10B

| Entity/SlotID (OVERVIEW) | Value ID | Value(REPRESENTATIVE WORDS) Synonyms(SYNONYMOUS WORDS) |
|---|---|---|
| Timing | timing_00000 | TODAY<br>THIS DAY |
| | timing_00001 | YESTERDAY |
| | timing_00002 | DAY BEFORE YESTERDAY<br>TWO DAYS AGO |
| | timing_00003 | LAST WEEK<br>ONE WEEK BEFORE<br>PREVIOUS WEEK |
| | timing_00004 | LAST TIME<br>PREVIOUS<br>ONE BEFORE |
| Frequency | freq_00000 | EVERY TIME<br>EACH TIME |
| | freq_00001 | FREQUENTLY<br>OFTEN<br>MANY TIMES |

FIG.10C

| Entity ID | Value ID | Value(REPRESENTATIVE WORDS) / Synonyms(SYNONYMOUS WORDS) |
|---|---|---|
| Finishing | fin_00000 | BINDING / STAPLING / STAPLE |
| | fin_00001 | PUNCHING / MAKE HOLES |
| | fin_00002 | FOLDING / TURN UP |

| Entity (OVERVIEW) | Value ID | Value(REPRESENTATIVE WORDS) / Synonyms(SYNONYMOUS WORDS) |
|---|---|---|
| Change | change_00000 | SAME / DUPLICATE / UNCHANGED |
| | change_00001 | SMALL / SMALLER / LESS / LESSEN / SHORT / SHORTER / MINUS / DECREASE / REDUCE |
| | change_00002 | LARGE / LARGER / LONG / LONGER / PLUS / INCREASE / ADD / ENLARGE / BIGGER |
| | change_00003 | STRONG / STRONGER / STRENGTHEN / ENHANCE / TIGHTEN |
| | change_00004 | WEAK / WEAKER / WEAKEN / LOOSEN |
| | change_00005 | HIGH / HIGHER |
| | change_00006 | LOW / LOWER |
| | change_00007 | DARKER / SHARPLY |
| | change_00008 | LIGHTER |
| | change_00009 | BLIGHTER |
| | change_00010 | DIM |

FIG.11A

| Intent ID | Utterance (UTTERANCE SAMPLE) |
|---|---|
| Copy_simple | MAKE A {CopyOperation} |
| | WANT TO MAKE A {CopyOperation} |
| | EXECUTE {CopyOperation} |
| | BEGIN {CopyOperation} |
| | START {CopyOperation} |
| | MAKE A {CopyOperation} AND {PrintOperation} |
| | {PrintOperation} IMAGE OBTAINED BY {ScanOperation} |
| | ⋮ |
| Copy_with_noc | MAKE {NUMBER} {CopyOperation} |
| | {NUMBER} {CopyOperation} |
| | EXECUTE {CopyOperation} BY {NUMBER} COPIES |
| | {ScanOperation} AND MAKE {NUMBER} {PrintOperation} |
| | {ScanOperation} AND TAKE {NUMBER} {PrintOperation} |
| | {PrintOperation} {NUMBER} COPIES OF IMAGE OBTAINED BY {ScanOperation} |
| | MAKE {NUMBER} {PrintOperation} OF IMAGE OBTAINED BY {ScanOperation} |
| | ⋮ |
| Copy_with_pside | {CopyOperation}{PaperSide} |
| | {PaperSide}{CopyOperation} |
| | MAKE A {CopyOperation} WITH {PaperSide} {PrintOperation} |
| | EXECUTE {CopyOperation} WITH {PaperSide} {PrintOperation} |
| | {ScanOperation} AND {PrintOperation} WITH {PaperSide} |
| | {ScanOperation} AND {PaperSide} {PrintOperation} |
| | {PrintOperation} AN IMAGE OBTAINED BY {ScanOperation} |
| | ⋮ |
| Copy_with_fin | {CopyOperation}{Finishing} |
| | {CopyOperation}{Position}{Finishing} |
| | {CopyOperation}{Finishing}{Position} |
| | {Finishing}{CopyOperation} |
| | {Position}{Finishing}{CopyOperation} |
| | {Finishing}{Position}{CopyOperation} |
| | EXECUTE {CopyOperation} BY {NUMBER} COPIES |
| | EXECUTE {ScanOperation} AND EXECUTE {PrintOperation} WITH {Finishing} |
| | EXECUTE {ScanOperation} AND EXECUTE {PrintOperation} WITH {Finishing} AT {Position} |
| | ⋮ |

FIG.11B

| Intent ID | Utterance (UTTERANCE SAMPLE) |
|---|---|
| Copy_with_2_settings | {CopyOperation} IN {ColorMode} BY {NUMBER} COPIES |
| | EXECUTE {CopyOperation} IN {ColorMode} BY {NUMBER} COPIES |
| | EXECUTE {CopyOperation} BY {NUMBER} COPIES IN {ColorMode} |
| | EXECUTE {CopyOperation} IN {ColorMode} BY {NUMBER} COPIES |
| | EXECUTE {PaperSide}{CopyOperation} IN {ColorMode} |
| | EXECUTE {ColorMode}{PaperSide}{CopyOperation} |
| | EXECUTE {PrintSide}{CopyOperation} IN {ColorMode} |
| | MAKE {PrintSide}{CopyOperation} IN {ColorMode} |
| | ⋮ |
| Copy_with_3_settings | MAKE {PaperSide}{CopyOperation} IN {ColorMode} BY {NUMBER} COPIES |
| | EXECUTE {PaperSide}{CopyOperation} IN {ColorMode} BY {NUMBER} COPIES |
| | MAKE {PaperSide}{ColorMode}{CopyOperation} BY {NUMBER} COPIES |
| | EXECUTE {PaperSide}{ColorMode}{CopyOperation} BY {NUMBER} COPIES |
| | EXECUTE {ColorMode}{PaperSide}{CopyOperation} BY {NUMBER} COPIES |
| | MAKE {PaperSide}{CopyOperation} IN {ColorMode} BY {NUMBER} COPIES |
| | EXECUTE {PaperSide}{CopyOperation} IN {ColorMode} BY {NUMBER} COPIES |
| | TAKE {PaperSide}{CopyOperation} IN {ColorMode} BY {NUMBER} COPIES |
| | ⋮ |
| Copy_with_4_settings | EXECUTE {PaperSide}{CopyOperation} IN {ColorMode} BY {NUMBER} COPIES WITH {Finishing} |
| | EXECUTE {PaperSide}{CopyOperation} IN {ColorMode} BY {NUMBER} COPIES WITH {Finishing} AT {Position} |
| | MAKE {PaperSide}{CopyOperation} IN {ColorMode} BY {NUMBER} COPIES WITH {Finishing} AT {Position} |
| | EXECUTE {PaperSide}{CopyOperation} IN {ColorMode} BY {NUMBER} COPIES WITH {Finishing} |
| | EXECUTE {PaperSide}{CopyOperation} IN {ColorMode} BY {NUMBER} COPIES WITH {Finishing} AT {Position} |
| | MAKE {PaperSide}{CopyOperation} IN {ColorMode} BY {NUMBER} COPIES WITH {Finishing} AT {Position} |
| | EXECUTE {PaperSide}{CopyOperation} IN {ColorMode} BY {NUMBER} COPIES WITH {Finishing} |
| | MAKE {PaperSide}{CopyOperation} IN {ColorMode} BY {NUMBER} COPIES WITH {Finishing} |
| | EXECUTE {PaperSide}{CopyOperation} IN {ColorMode} BY {NUMBER} COPIES WITH {Finishing} AT {Position} |
| | EXECUTE {PaperSide}{CopyOperation} IN {ColorMode} BY {NUMBER} COPIES WITH {Finishing} |
| | MAKE {PaperSide}{CopyOperation} IN {ColorMode} BY {NUMBER} COPIES WITH {Finishing} AT {Position} |
| | ⋮ |

FIG.12A

| Intent ID | Utterance (UTTERANCE SAMPLE) |
|---|---|
| Send_simple | {SendOperation} IN {PaperType} |
| | EXECUTE {SendOperation} OF {PaperType} |
| | WANT TO EXECUTE {SendOperation} |
| | EXECUTE {ScanOperation} AND EXECUTE {SendOperation} |
| | EXECUTE {ScanOperation} OF {PaperType} AND EXECUTE {SendOperation} |
| | EXECUTE {SendOperation} |
| | ⋮ |
| Send_with_pside | EXECUTE {PaperSide}{ScanOperation} OF {PaperType} AND EXECUTE {SendOperation} |
| | EXECUTE {PaperSide}{ScanOperation} AND EXECUTE {SendOperation} |
| | EXECUTE {PaperSide}{ScanOperation} |
| | ⋮ |
| Send_with_colormode | EXECUTE {SendOperation} IN {ColorMode} |
| | EXECUTE {ScanOperation} IN {ColorMode} AND EXECUTE {SendOperation} |
| | EXECUTE {SendOperation} OF {PaperType} IN {ColorMode} |
| | EXECUTE {ScanOperation} OF {PaperType} IN {ColorMode} AND EXECUTE {SendOperation} |
| | ⋮ |
| Send_with_destination | {SendOperation} TO {Adree_LastName} |
| | EXECUTE {SendOperation} TO {Adree_LastName} |
| | EXECUTE {SendOperation} OF {PaperType} TO {Adree_LastName} |
| | EXECUTE {ScanOperation} OF {PaperType} AND EXECUTE {SendOperation} |
| | ⋮ |
| Send_with_2_settings | EXECUTE {PaperSide}{SendOperation} IN {ColorMode} |
| | EXECUTE {PaperSide}{SendOperation} OF {PaperType} IN {ColorMode} |
| | EXECUTE {PaperSide}{ScanOperation} OF {PaperType} IN {ColorMode} AND EXECUTE {SendOperation} |
| | ⋮ |
| Print_Simple | {PrintOperation} |
| | EXECUTE {PrintOperation} |
| | WANT TO EXECUTE {PrintOperation} |
| | START {PrintOperation} |
| | EXECUTE {PrintOperation} OF INPUT JOB |
| | EXECUTE {PrintOperation} OF INPUT JOB BY {Quantity} |
| | ⋮ |
| Recommend_setting02 | WANT TO EXECUTE {SendOperation} USING SETTING FREQUENTLY USED WHEN {SendOperation} IS EXECUTED TO {Adree_LastName} |
| | WANT TO EXECUTE {SendOperation} USING POPULAR SETTING USED WHEN {SendOperation} IS EXECUTED TO {Adree_LastName} |
| | ⋮ |

FIG.12B

| Intent ID | Utterance (UTTERANCE SAMPLE) |
|---|---|
| Copy_history1 | {CopyOperation} USING SAME SETTING AS {Timing} |
| | EXECUTE {CopyOperation} USING SAME SETTING AS {Timing} |
| | ⋮ |
| Copy_history2 | {CopyOperation} USING SETTING OF {Frequency} |
| | EXECUTE {CopyOperation} USING SETTING OF {Frequency} |
| | ⋮ |
| Send_History1 | {SendOperation} USING SAME SETTING AS {Timing} |
| | EXECUTE {SendOperation} USING SAME SETTING AS {Timing} |
| | ⋮ |
| Send_History2 | {SendOperation} USING SETTING OF {Frequency} |
| | EXECUTE {SendOperation} USING SETTING OF {Frequency} |
| | ⋮ |
| Send_History3 | {SendOperation} TO {Adree_LastName} USING SETTING OF {Frequency} |
| | WANT TO EXECUTE {SendOperation} TO {Adree_LastName} USING SETTING OF {Frequency} |
| | ⋮ |
| Print_History1 | {PrintOperation} OF FILE OF {Timing} ONCE MORE |
| | WANT TO EXECUTE {PrintOperation} OF FILE OF {Timing} ONCE MORE |
| | ⋮ |
| Print_History2 | {SendOperation} USING SAME SETTING AS {Timing} |
| | EXECUTE {SendOperation} USING SAME SETTING AS {Timing} |
| | ⋮ |
| Print_History3 | {SendOperation} USING SETTING OF {Frequency} |
| | EXECUTE {SendOperation} USING SETTING OF {Frequency} |
| | ⋮ |
| Recommend_Setting01 | {PrintOperation} USING SETTING FREQUENTLY USED IN PRESENTATION |
| | WANT TO EXECUTE {PrintOperation} USING SETTING FREQUENTLY USED IN PRESENTATION |
| | {PrintOperation} USING SETTING FREQUENTLY USED IN CONFERENCE |
| | WANT TO EXECUTE {PrintOperation} USING SETTING FREQUENTLY USED IN CONFERENCE |
| | ⋮ |

FIG.13A

```
{
   "Intent ID": "Copy_simple",
   "Entities": [
      {
         "Entity ID": "CopyOperation",
         "Value ID": "copy_00000"
      }
   ]
}
```

FIG.13B

```
{
   "Intent ID": "Copy_with_noc",
   "Entities": [
      {
         "Entity ID": "NUMBER",
         "Value ID": "THREE"
      },
      {
         "Entity ID": "CopyOperation",
         "Value ID": "copy_00000"
      }
   ]
}
```

FIG.13C

```
{
   "Intent ID": "Copy_with_4_settings",
   "Entities": [
      {
         "Entity ID": "ColorMode",
         "Value ID": "cm_00005"
      },
      {
         "Entity ID": "PaperSide",
         "Value ID": "pside_00001"
      },
      {
         "Entity ID": "NUMBER",
         "Value ID": "TEN"
      },
      {
         "Entity ID": "Position",
         "Value ID": "pos_00007"
      },
      {
         "Entity ID": "Finishing",
         "Value ID": "fin_00000"
      },
      {
         "Entity ID": "CopyOperation",
         "Value ID": "copy_00000"
      }
   ]
}
```

FIG.13D

```
{
  "Intent ID": "Send_simple",
  "Entities": [
    {
      "Entity ID": "SendOperation",
      "Value ID": "send_00000"
    }
  ]
}
```

FIG.13E

```
{
  "Intent ID": "Send_with_2_settings",
  "Entities": [
    {
      "Entity ID": "PaperSide",
      "Value ID": "pside_00001"
    },
    {
      "Entity ID": "Address_LastName",
      "Value ID": "YAMADA"
    },
    {
      "Entity ID": "SendOperation",
      "Value ID": "send_00000"
    }
  ]
}
```

FIG.13F

```
{
  "Intent ID": "Send_with_PaperSide",
  "Entities": [
    {
      "Entity ID": "PaperSide",
      "Value ID": "pside_00001"
    },
    {
      "Entity ID": "SendOperation",
      "Value ID": "send_00000"
    }
  ]
}
```

FIG.13G

```
{
  "Intent ID": "Send_with_destination",
  "Entities": [
    {
      "Entity ID": "Address_LastName",
      "Value ID": "YAMADA"
    },
    {
      "Entity ID": "SendOperation",
      "Value ID": "send_00000"
    }
  ]
}
```

FIG.22A

| JOB EXECUTION ESSENTIAL REQUIREMENT \ JOB NAME | CopyOperation (COPY INSTRUCTION) | PrintOperation (PRINT INSTRUCTION) | ScanOperation (SCAN INSTRUCTION) | StoreOperation (STORE INSTRUCTION) | SendOperation (SEND INSTRUCTION) | FaxOperation (SEND INSTRUCTION) |
|---|---|---|---|---|---|---|
| SCAN AVAILABLE | NECESSARY | UNNECESSARY | NECESSARY | NECESSARY | NECESSARY | NECESSARY |
| PRINT AVAILABLE | NECESSARY | NECESSARY | UNNECESSARY | UNNECESSARY | UNNECESSARY | UNNECESSARY |
| PRINT SHEET | NECESSARY | NECESSARY | UNNECESSARY | UNNECESSARY | UNNECESSARY | UNNECESSARY |
| FAX LINE | UNNECESSARY | UNNECESSARY | UNNECESSARY | UNNECESSARY | UNNECESSARY | NECESSARY |
| DOCUMENT SET | NECESSARY | UNNECESSARY | NECESSARY | NECESSARY | NECESSARY | NECESSARY |
| DESIGNATION OF NUMBER OF COPIES | OPTIONAL | OPTIONAL | UNNECESSARY | UNNECESSARY | UNNECESSARY | UNNECESSARY |
| DESIGNATION OF PRINT DUPLEX | OPTIONAL | UNNECESSARY | UNNECESSARY | UNNECESSARY | UNNECESSARY | UNNECESSARY |
| DESIGNATION OF DOCUMENT DUPLEX | OPTIONAL | UNNECESSARY | OPTIONAL | OPTIONAL | OPTIONAL | OPTIONAL |
| DESIGNATION OF DESTINATION | UNNECESSARY | UNNECESSARY | UNNECESSARY | NECESSARY | NECESSARY | NECESSARY |
| DESIGNATION OF COLOR | OPTIONAL | OPTIONAL | OPTIONAL | OPTIONAL | OPTIONAL | OPTIONAL |

FIG.22B

| JOB NAME | CopyOperation (COPY INSTRUCTION) | PrintOperation (PRINT INSTRUCTION) | ScanOperation (SCAN INSTRUCTION) | StoreOperation (STORE INSTRUCTION) | SendOperation (SEND INSTRUCTION) | FaxOperation (SEND INSTRUCTION) |
|---|---|---|---|---|---|---|
| EXECUTION PERMISSION CONFIRMATION | CONFIRM | CONFIRM | CONFIRM | CONFIRM | CONFIRM | CONFIRM |

FIG.22C

| JOB NAME / JOB PARAMETER | CopyOperation (COPY INSTRUCTION) | PrintOperation (PRINT INSTRUCTION) | ScanOperation (SCAN INSTRUCTION) | StoreOperation (BOX STORE INSTRUCTION) | SendOperation (SEND INSTRUCTION) | FaxOperation (FAX SEND INSTRUCTION) |
|---|---|---|---|---|---|---|
| NUMBER OF COPIES | 1 | 1 | — | — | — | — |
| PRINT DUPLEX | DUPLEX | DUPLEX | — | — | — | — |
| DOCUMENT DUPLEX | DUPLEX | — | DUPLEX | DUPLEX | DUPLEX | SIMPLEX |
| DESTINATION | — | — | — | — | — | — |
| COLOR | MONOCHROME | MONOCHROME | COLOR | COLOR | COLOR | MONOCHROME |

FIG.23A

| JOB EXECUTION ESSENTIAL REQUIREMENT \ JOB NAME | CopyOperation (COPY INSTRUCTION) | PrintOperation (PRINT INSTRUCTION) | ScanOperation (SCAN INSTRUCTION) | StoreOperation (STORE INSTRUCTION) | SendOperation (SEND INSTRUCTION) | FaxOperation (SEND INSTRUCTION) |
|---|---|---|---|---|---|---|
| SCAN AVAILABLE | NECESSARY | UNNECESSARY | NECESSARY | NECESSARY | NECESSARY | NECESSARY |
| PRINT AVAILABLE | NECESSARY | NECESSARY | UNNECESSARY | UNNECESSARY | UNNECESSARY | UNNECESSARY |
| PRINT SHEET | NECESSARY | NECESSARY | UNNECESSARY | UNNECESSARY | UNNECESSARY | UNNECESSARY |
| FAX LINE | UNNECESSARY | UNNECESSARY | UNNECESSARY | UNNECESSARY | UNNECESSARY | NECESSARY |
| DOCUMENT SET | NECESSARY | UNNECESSARY | NECESSARY | NECESSARY | NECESSARY | NECESSARY |
| STORAGE AUTHENTICATION | UNNECESSARY | UNNECESSARY | UNNECESSARY | NECESSARY | UNNECESSARY | UNNECESSARY |
| NETWORK AUTHENTICATION | UNNECESSARY | UNNECESSARY | UNNECESSARY | UNNECESSARY | NECESSARY | UNNECESSARY |
| DESIGNATION OF NUMBER OF COPIES | <OPTIONAL> | <OPTIONAL> | UNNECESSARY | UNNECESSARY | UNNECESSARY | UNNECESSARY |
| DESIGNATION OF PRINT DUPLEX | <OPTIONAL> | <OPTIONAL> | UNNECESSARY | UNNECESSARY | UNNECESSARY | UNNECESSARY |
| DESIGNATION OF DOCUMENT DUPLEX | <OPTIONAL> | UNNECESSARY | <OPTIONAL> | <OPTIONAL> | <OPTIONAL> | <OPTIONAL> |
| DESIGNATION OF DESTINATION | UNNECESSARY | UNNECESSARY | UNNECESSARY | <OPTIONAL> | <NECESSARY> | <NECESSARY> |
| DESIGNATION OF COLOR | <OPTIONAL> | <OPTIONAL> | <OPTIONAL> | <OPTIONAL> | <OPTIONAL> | <OPTIONAL> |

FIG.23B

| JOB NAME | CopyOperation (COPY INSTRUCTION) | PrintOperation (PRINT INSTRUCTION) | ScanOperation (SCAN INSTRUCTION) | StoreOperation (STORE INSTRUCTION) | SendOperation (SEND INSTRUCTION) | FaxOperation (SEND INSTRUCTION) |
|---|---|---|---|---|---|---|
| EXECUTION PERMISSION CONFIRMATION | <OMIT> | <CONFIRM> | <CONFIRM> | <CONFIRM> | <OMIT> | <CONFIRM> |

FIG.23C

| JOB PARAMETER \ JOB NAME | CopyOperation (COPY INSTRUCTION) | PrintOperation (PRINT INSTRUCTION) | ScanOperation (SCAN INSTRUCTION) | StoreOperation (BOX STORE INSTRUCTION) | SendOperation (SEND INSTRUCTION) | FaxOperation (FAX SEND INSTRUCTION) |
|---|---|---|---|---|---|---|
| NUMBER OF COPIES | <1> | <1> | — | — | — | — |
| PRINT DUPLEX | <DUPLEX> | <DUPLEX> | — | — | — | — |
| DOCUMENT DUPLEX | <DUPLEX> | — | <DUPLEX> | <DUPLEX> | <DUPLEX> | <SIMPLEX> |
| DESTINATION | — | — | — | <BOX1> | <NONE> | <MR. YAMADA> |
| COLOR | <MONOCHROME> | <MONOCHROME> | <COLOR> | <COLOR> | <COLOR> | MONOCHROME |

IMAGE PROCESSING SYSTEM, IMAGE PROCESSING APPARATUS, AND IMAGE PROCESSING METHOD

BACKGROUND OF THE INVENTION

Field of the Invention

The present invention relates to an image processing system that is capable of providing a voice notification and a screen notification in response to an operation input by voice. An image processing apparatus included in the image processing system can be applied to an apparatus such as a copying apparatus, a printer, a scanner, and a facsimile (FAX), and can be further applied to a general information processing apparatus such as a personal computer (PC).

Description of the Related Art

As the speech recognition technique develops, apparatuses that perform processes in response to a voice instruction have become common, Japanese Patent Application Laid-Open No. 2019-67258 discusses a system capable of performing the processes of a printing apparatus (image processing apparatus) response to voice of a user. Japanese Patent Application Laid-Open 2019-67258 discusses, as a method of notifying the user of information, a notification method based on voice information, and a notification method based on screen information.

The technique discussed in Japanese Patent Application Laid-Open 2019-67258 leaves room for improvement in the method of notifying the user of information, from the aspect of usability enhancement, Japanese Patent Application Laid-Open 2019-67258 discusses the notification method based on voice information, and the notification method based on screen information, but the use of these notification methods in combination has not been considered in detail. The notification method based on voice information and the notification method based on screen information have their individual advantages and disadvantages. Thus, it is desirable that the system excellent in usability be provided through an appropriate combination of these notification methods.

SUMMARY OF THE INVENTION

The present invention is directed to providing an image processing system that is capable of providing a notification to a user who issues an instruction by voice, by appropriately combining voice information and screen information.

According to an aspect of the present invention, an image processing system includes an image processing device configured to process an image, a microphone configured to acquire sound, a display configured to display information, and one or more controllers. The one or more controllers are configured to function as a unit configured to acquire text information based on voice information acquired via the microphone, and a unit configured to cause the image processing device to execute image processing in response to an execution command being acquired from the text information, and to cause the display to display, in response to an execution command related to the image processing being not acquired from the text information and a setting command related to the image processing being acquired, a screen for waiting for an execution instruction to execute image processing that is based on at least the setting command.

Further features of the present invention will become apparent from the following description of exemplary embodiments with reference to the attached drawings.

BRIEF DESCRIPTION OF THE DRAWINGS

FIGS. 8A, 8B, 8C each are a diagram illustrating an entity list of operation intent registration information.
FIGS. 9A, and 9B each are a diagram illustrating an entity list of operation intent registration information.
FIGS. 10A, 10B, and 10C each are a diagram illustrating an entity list of operation intent registration information.
FIGS. 11A and 11B are each a diagram illustrating an intent list of operation intent registration information.
FIGS. 12A and 12B are each a diagram illustrating an intent list of operation intent registration information.
FIGS. 13A, 13B, 13C, 13D, 13E, 13F, and 13G are diagrams each illustrating an example of operation intent data,
FIG. 22A is a diagram illustrating a data table of a job execution requirement.
FIG. 22B is a diagram illustrating a data table of a confirmation setting of an execution permission.
FIG. 22C is a diagram illustrating a data table of a job parameter,
FIG. 23A is a diagram illustrating a data table of a job execution requirement.
FIG. 23B is a diagram illustrating a data table of a confirmation setting of an execution permission.
FIG. 23C is a diagram illustrating a data table of a job parameter.

DESCRIPTION OF THE EMBODIMENTS

Hereinafter, exemplary embodiments of the present invention will be described with reference to the accompanying drawings using specific examples. The configurations for carrying out the present invention are not limited to the configurations described in the following exemplary embodiments. A part of the described configurations may be omitted or replaced with an equivalent as long as similar effects can be obtained.

<Configuration of Image Processing System>

Figure 1:
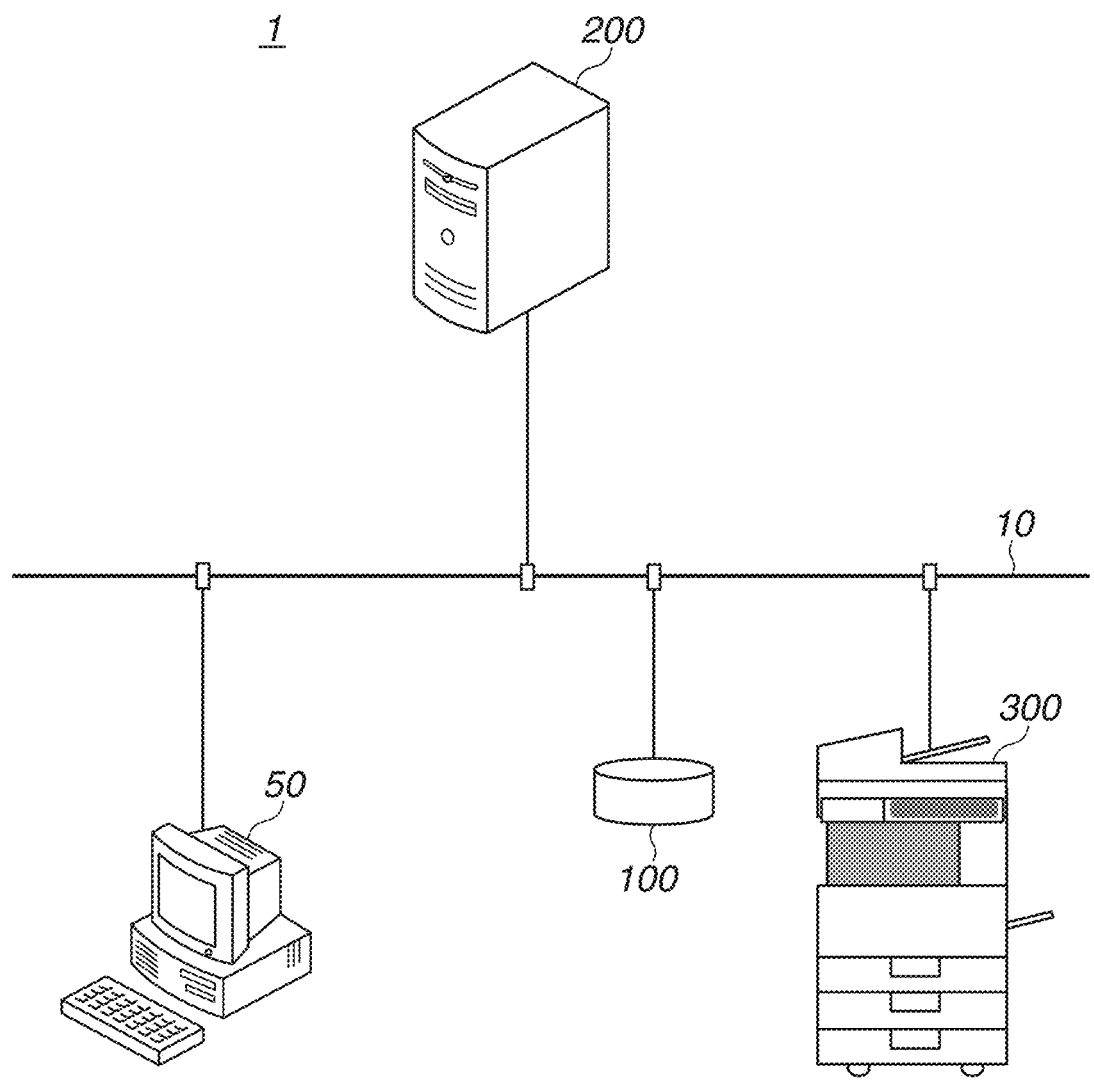
FIG. 1 is a diagram illustrating a system configuration.

FIG. 1 illustrates an example of a configuration diagram of an image processing system 1 according to the present exemplary embodiment. As illustrated in FIG. 1, the image processing system 1 according to the present exemplary embodiment includes, for example, a voice control apparatus 100, an image formation apparatus 300, a server 200, and a client terminal 50. The apparatuses are connected via a network 10 in such a manner that communication can be performed with each other. The communication via the network 10 may be performed via a cable or may be performed wirelessly. The numbers of voice control apparatuses 100, image formation apparatuses 300, and client terminals 50 are not limited to one, and a plurality of voice control apparatuses 100, a plurality of image formation apparatuses 300, and a plurality of client terminals 50 may be connected to the network 10.

In accordance with a voice operation start instruction from the user, the voice control apparatus 100 acquires voice of the user and transmits encoded voice data to the server 200. The voice control apparatus 100 is a smart speaker, for example. In the present exemplary embodiment, the voice control apparatus 100 and the image formation apparatus 300 are independent, but the present invention is not limited to this configuration. For example, hardware components (FIG. 2) included in the voice control apparatus 100, and a program (FIG. 5) executed by the voice control apparatus 100 may be included in the image formation apparatus 300. Furthermore, a program executed by the server 200 may be included in the image formation apparatus 300.

The image formation apparatus 300 is a multifunction peripheral (MFP) including a plurality of functions, such as a copy function, a scan function, a print function, a facsimile (FAX) function, and e-mail sending, or a single-function printer (SFP) or scanner including a single function, for example. In the image processing system 1 according to the present exemplary embodiment, the image formation apparatus 300 will be described as a color laser beam MFP.

The server 200 provides a service of performing speech recognition of voice data about the user that has been acquired by the voice control apparatus 100, and analyzing whether the voice data intends any of various job execution operations of the image formation apparatus 300, The voice control apparatus 100 performs synthesis of voice data to be reproduced by voice. The server 200 can provide a highly-accurate speech recognition result by using machine learning that uses a neural network, such as deep learning, for example. The server 200 is compatible with natural language processing, and can acquire appropriate information (word, kana-kanji conversion result) from input natural language by performing morphological analysis, syntax analysis, semantic analysis, and context analysis. In the machine learning, for example, a learning model is trained based on supervised data including a pair of voice information and text information. A job refers to a unit of a series of image forming processes (e.g., copy, scan, print, etc.) which is implemented by the image formation apparatus 300 using a scanner 380 and/or a printer 390.

The client terminal 50 is a personal computer (PC) used by the user, for example. The client terminal 50 issues a print job for causing the image formation apparatus 300 to print an electronic file stored in a storage of the client terminal 50 or an external server (not illustrated). The client terminal 50 receives image data scanned by the mage formation apparatus 300. A mobile terminal, such as a smartphone, may be used as the client terminal 50. The operations of the client terminal 50 are unrelated to a series of descriptions of the present exemplary embodiment, and thus, further detailed description will be omitted.

The network 10 is a local area network (LAN) or a wide area network (WAN), or the network 10 may be the internet. The voice control apparatus 100, the image formation apparatus 300, the server 200, and the client terminal 50 are connected to the network 10 directly or via a connection device (not illustrated), such as a router, a gateway, a proxy server, or a wireless LAN access point, and can communicated with each other. The configuration of the network 10 and the number of connection devices connected thereto are not limited to those illustrated in FIG. 1. The network 10 may have any configuration as long as data transmission and reception can be performed between the voice control apparatus 100, the image formation apparatus 300, the server 200, and the client terminal 50.

<Hardware Configuration of Voice Control Apparatus>

Figure 2:
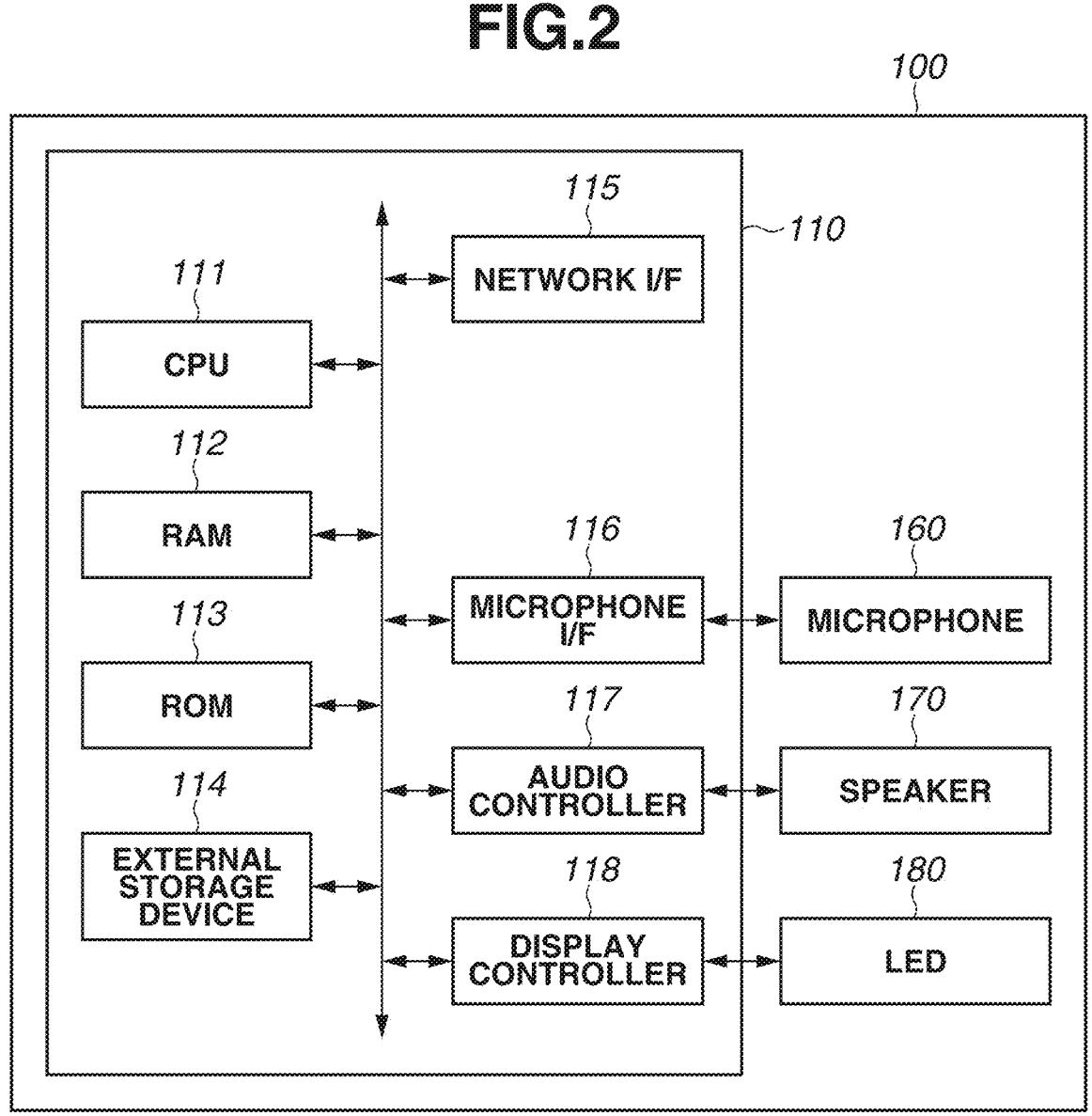
FIG. 2 is a conceptual diagram illustrating a hardware configuration of a voice control apparatus.

FIG. 2 is a diagram illustrating a hardware configuration example of the voice control apparatus 100. The voice control apparatus 100 includes a controller unit 110, a microphone 160, a speaker 170, and a light-emitting diode (LED) 180. The controller unit 110 includes a central processing unit (CPU) 111, a random access memory (RAM) 112, a read-only memory (ROM) 113, an external storage device 114, a network I/F 115, a microphone I/F 116, an audio controller 117, and a display controller 118 that are connected to a system bus.

The CPU 111 is an execution medium for a program that is incorporated in the voice control apparatus 101). The RAM 112 is a volatile memory, the ROM 113 is a nonvolatile memory, and the external storage device 114 is a large volume storage device (e.g., a secure-digital (SD) card) as compared with the RAM 112, The ROM 113 or the external storage device 114 stores, for example, a program to be executed by the CPU 111, and this program is loaded onto the RAM 112 when being executed. The RAM 112 operates as a work memory that is used when a program is executed on the CPU 111. The network I/F 115 includes a circuit and an antenna for performing data communication in compliance with a wireless communication standard, such as Wi-Fi (registered trademark) or a Bluetooth®, or a wired communication standard, such as Ethernet, and implements data transmission and reception via the network 10.

The microphone I/F 116 is connected to the microphone 160, converts voice input from the microphone 160, into encoded voice data, and stores the encoded voice data into the RAM 112 in accordance with an instruction from the CPU 111. The microphone 160 is, for example, a compact microelectromechanical system (MEMS) microphone which is mounted on, for example, a smartphone. Three or more microphones 160 are to be provided at predetermined intervals in such a manner that an arrival direction of voice uttered by the user can be calculated. In the present exemplary embodiment, it is sufficient that voice uttered by the user can be clearly acquired. Thus, a plurality of voice acquisition sensors does not necessarily need to be provided for calculating the arrival direction of voice uttered by the user.

The audio controller 117 is connected to the speaker 170, converts voice data into an analog voice signal in accordance with an instruction from the CPU 111, and outputs voice through the speaker 170. The speaker 170 reproduces response sound of the apparatus indicating that the voice control apparatus 100 is responding, and speech synthesized by the server 200. The speaker 170 is a general-purpose device for reproducing voice. The structure of the speaker 170 is not a main point of the present exemplary embodiment, and thus, further description will be omitted.

The display controller 118 is connected to the LED 180, and controls display of the LED 180 in accordance with an instruction from the CPU 111. The display controller 118 mainly performs lighting control of the LED 180 to indicate that voice uttered by the user is correctly input. The LED 180 is a blue LED visible to the user, for example. The LED 180 is a general-purpose device. The structure of the LED 180 is not a main point of the present exemplary embodiment, and thus, further description will be omitted. The LED 180 may be replaced with a display device that can display characters or pictures.

<Hardware Configuration of Server>

Figure 3:
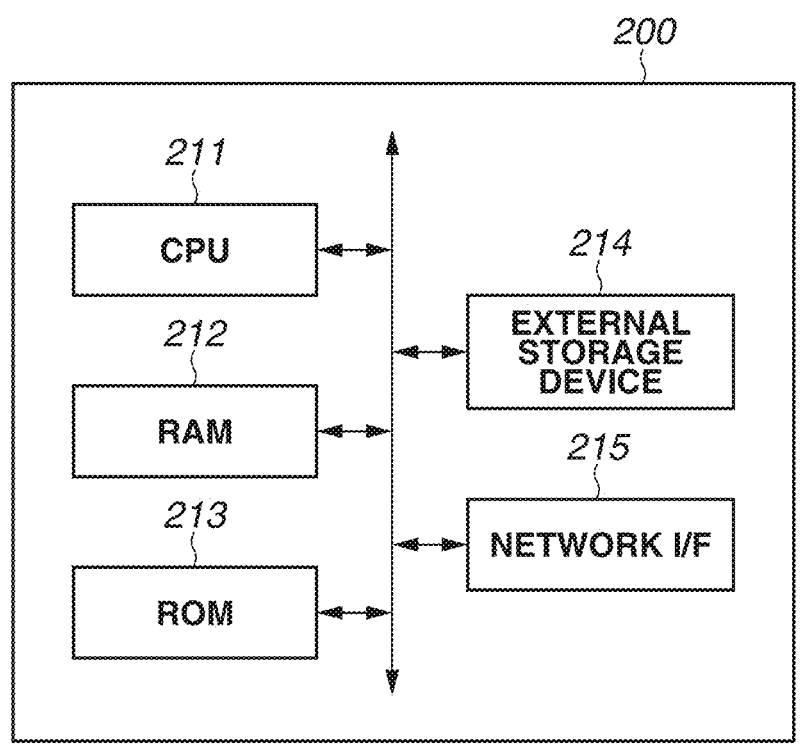
FIG. 3 is a conceptual diagram illustrating a hardware configuration of a server.

FIG. 3 is a diagram illustrating a hardware configuration example of the server 200. The server 200 includes a CPU 211, a RAM 212, a ROM 213, an external storage device 214, and a network 215.

The CPU 211 is an execution medium for a program that is incorporated in the server 200. The RAM 212 is a volatile memory, the ROM 213 is a nonvolatile memory, and the external storage device 214 is a large volume storage device (e.g., a hard disk drive, HDD) as compared with the RAM 212. The ROM 213 or the external storage device 214 stores a program to be executed by the CPU 211, and this program is loaded onto the RAM 212 when being executed. The RAM 212 operates as a work memory used when a program is executed on the CPU 211. The external storage device 214 stores various types of data to be used when a program is executed. The network I/F 215 includes a circuit for performing data communication in compliance with a wired communication standard, such as Ethernet, and implements data transmission and reception via the network 10.

<Hardware Configuration of Image Formation Apparatus>

Figure 4:
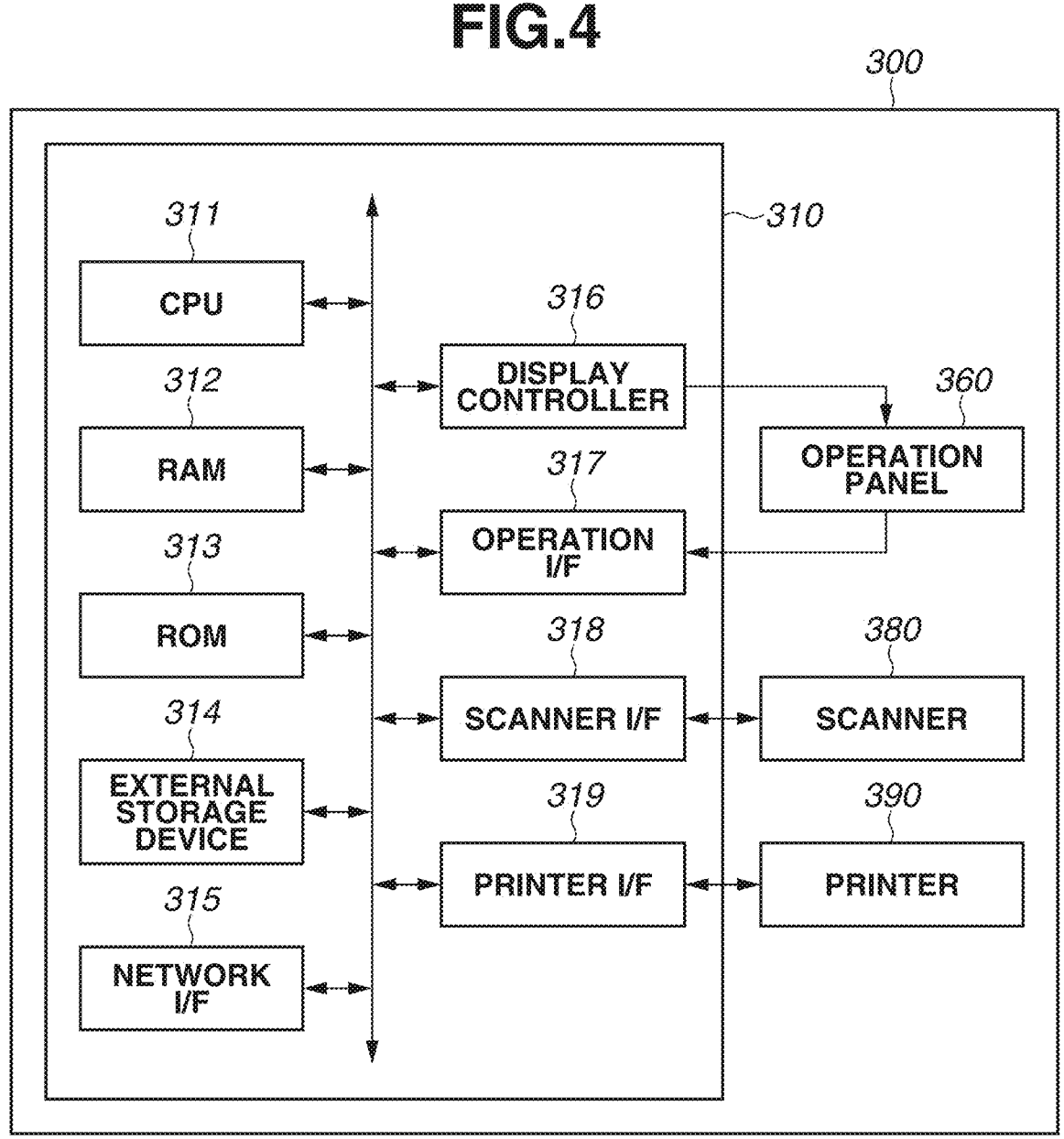
FIG. 4 is a conceptual diagram illustrating a hardware configuration of an image formation apparatus.

FIG. 4 is a diagram illustrating a hardware configuration example of the image formation apparatus 300. The image formation apparatus 300 includes a controller unit 310, an operation panel 360, the scanner 380 (image processing device, reading device), and the printer 390 (image processing device, image formation device, printing device). The controller unit 310 includes a CPU 311, a RAM 312, a ROM 313, an external storage device 314, a network I/F 315, a display controller 316, an operation IN 317, a scanner I/F 318, and a printer I/F 319 that are connected to a system bus.

The CPU 311 is an execution medium for a program that is incorporated in the image formation apparatus 300. The RAM 312 is a volatile memory, the ROM 313 is a nonvolatile memory, and the external storage device 314 is a large volume storage device (e.g., an HDD) as compared with the RAM 312. The ROM 313 or the external storage device 314 stores a program to be executed by the CPU 311, and this program is loaded onto the RAM 312 when being executed. The RAM 312 operates as a work memory used when a program is executed on the CPU 311. The network 315 includes a circuit and/or an antenna for performing data communication in compliance with a wireless communication standard, such as Wi-Fi or Bluetooth®, or a wired communication standard, such as Ethernet, and implements data transmission and reception via the network 10.

The display controller 316 controls the display on a screen of the connected operation panel 360 in accordance with an instruction from the CPU 311. The operation I/F 317 receives an operation signal emitted in accordance with a user operation performed on the operation panel 360.

The scanner LT 318 transmits a control command to the connected scanner 380 in accordance with an instruction from the CPU 311, and writes image data received from the scanner 380, into the RAM 312. The scanner I/F 318 acquires various types of state information about the scanner 380. In accordance with the control command received from the scanner I/F 318, the scanner 380 reads a document on a platen glass (not illustrated) included in the image formation apparatus 300, using an optical unit.

In accordance with an instruction from the CPU 311, the printer I/F 319 transmits a control command and image data to the connected printer 390. The printer I/F 319 acquires various states of the printer 390. In accordance with the control command received from the printer I/F 319, the printer 390 prints the received image data onto a sheet.

<Configuration of Voice Control Program of Voice Control Apparatus>

Figure 5:
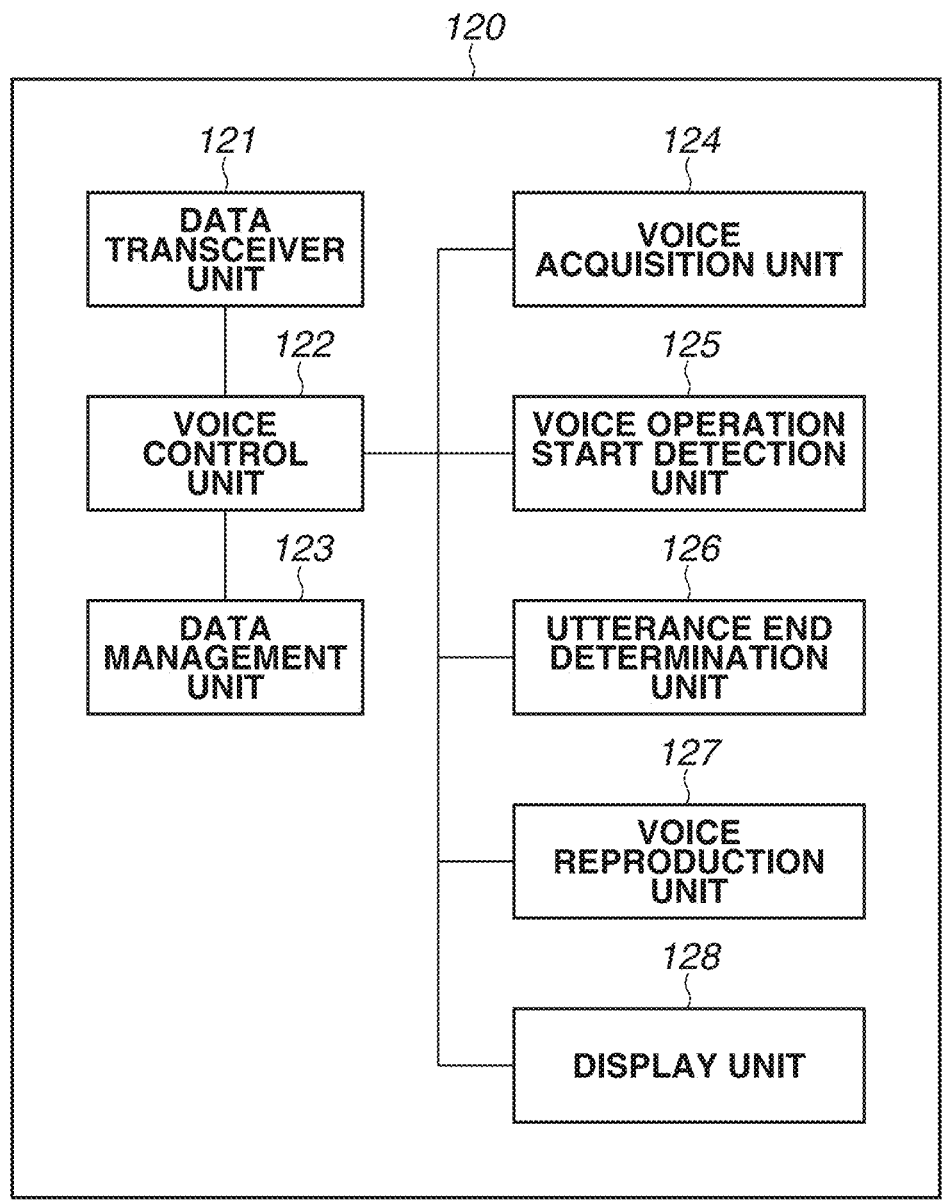
FIG. 5 is a conceptual diagram illustrating a functional configuration of a control program of the voice control apparatus.

FIG. 5 is a block diagram illustrating a functional configuration of a voice control program 120 of the voice control apparatus 100 that is to be executed by the CPU 111. As described above, the voice control program 120 of the voice control apparatus 100 is stored in the ROM 113 or the external storage device 114, and loaded onto the RAM 112 when being executed by the CPU 111.

A data transceiver unit 121 performs, via the network I/F 115, data transmission and reception other devices connected to the network 10. For example, the data transceiver unit 121 transmits, to the server 200, voice data acquired by a voice acquisition unit 124 (described below). The data transceiver unit 121 receives speech synthesis data generated by the server 200.

A data management unit 123 stores various types of data, such as work data generated in the execution of the voice control program 120, into a predetermined region of the external storage device 114, and manages the stored data. For example, the data management unit 123 manages authentication information required when communication is performed with the server 200.

The voice acquisition unit 124 converts analog voice of the user existing near the voice control apparatus 100, where the analog voice is acquired by the microphone 160, into voice data, and temporarily stores the converted voice data. More specifically, in accordance with an instruction from a voice control unit 122, the voice acquisition unit 124 converts the analog voice into a predetermined digital format (e.g., MPEG-1 Audio Layer 111 (MP3), etc.) processable by the server 200, and temporarily stores the converted voice data into the RAM 112.

In response to a voice operation start detection unit 125 detecting a wake word Littered by the user toward the voice control apparatus 100, or the press of a voice input start key (not illustrated) of the voice control apparatus 100, the voice operation start detection unit 125 transmits an operation start notification to the voice control unit 122. The wake word indicates a predetermined specific voice word. The voice operation start detection unit 125 constantly detects a wake word from analog voice acquired by the microphone 160. By uttering a wake word toward the voice control apparatus 100 and subsequently speaking what the user wants to do, the user can perform an operation and an instruction to the image formation apparatus 300.

An utterance end determination unit 126 determines an end timing of processing executed by the voice acquisition unit 124. More specifically, the utterance end determination unit 126 determines whether analog voice acquired by the voice acquisition unit 124 includes the characteristic of voice uttered by the user (voice characteristic of an individual user or a normal voice characteristic of a human). If the characteristic of voice uttered by the user has not been detected for a certain period of time, the utterance end determination unit 126 determines that voice uttered by the user ends. If the utterance end determination unit 126 determines that voice uttered by the user ends, the utterance end determination unit 126 transmits an utterance end notification to the voice control unit 122. The determination of an utterance end may be performed by detecting a specific keyword from analog voice acquired by the voice acquisition unit 124. The determination of an utterance end may be performed by the server 200 instead of the utterance end determination unit 126 of the voice control apparatus 100. An utterance end may be determined based on the meaning or context of utterance phrase of the user. Hereinafter, a time period in which the characteristic of voice uttered by the user is not included in analog voice acquired by the voice acquisition unit 124 will be referred to as a blank time period.

In accordance with an instruction from the voice control unit 122, a voice reproduction unit 127 reproduces speech synthesis data received by the data transceiver unit 121, using the speaker 170 via the audio controller 117.

In accordance with an instruction from the voice control unit 122, a display unit 128 controls the LED 180 via the display controller 118. For example, the display unit 128 controls lighting, blinking, and lights-out of the LED 180 to notify the user that the voice control apparatus 100 is in a wake word detection state or a voice acquisition state.

The voice control unit 122 controls the other modules in the voice control program 120 such that the other modules operate in cooperation with each other. Specifically, the voice control unit 122 issues a processing start/end instruction to the voice acquisition unit 124, the voice reproduction unit 127, and the display unit 128. The voice control unit 122 instructs the data transceiver unit 121 to transmit voice data acquired by the voice acquisition unit 124, to the server 200. The voice control unit 122 further instructs the voice reproduction unit 127 to reproduce speech synthesis data received by the data transceiver unit 121.

The description will now be provided of processes of implementing a series of speech dialogues performed between the user and the voice control apparatus 100 by the other modules in the voice control program 120 cooperating with each other.

If the voice control unit 122 receives an operation start notification from the voice operation start detection unit 125, the voice control unit 122 instructs the voice acquisition unit 124 to start processing. If the voice control unit 122 receives an utterance end notification from the utterance end determination unit 126, the voice control unit 122 instructs the voice acquisition unit 124 to end processing. For example, it is assumed that the user utters a wake word toward the voice control apparatus 100, and subsequently utters "I want to make a copy". At this time, the voice operation start detection unit 125 detects voice of the wake word and transmits an operation start notification to the voice control unit 122. If the voice control unit 122 receives the operation start notification, the voice control unit 122 performs control to cause the voice acquisition unit 124 to start processing. The voice acquisition unit 124 acquires analog voice "I want to make a copy" uttered subsequently to the wake word, converts the analog voice into voice data, and temporarily stores the converted voice data. If the utterance end determination unit 126 determines that a blank time period has continued for a predetermined time period after the user utters "I want to make a copy", the utterance end determination unit 126 transmits an utterance end notification to the voice control unit 122. If the voice control unit 122 receives the utterance end notification, the voice control unit 122 causes the voice acquisition unit 124 to end the processing. During a time period from when the voice acquisition unit 124 starts the processing to when the voice acquisition unit 124 ends the processing, the display unit 128 controls the LED 180 to light to notify the user that the voice control apparatus 100 is currently in a voice acquisition state.

Subsequently, the voice control unit 122 performs control to cause the voice acquisition unit 124 to transmit the temporarily-stored voice data to the server 200 via the data transceiver unit 121, and waits for a response from the server 200. The response from the server 200 includes speech synthesis data generated by the server 200. The voice control unit 122 controls the voice reproduction unit 127 to reproduce the speech synthesis data received via the data transceiver unit 121. For example, the voice reproduction unit 127 reproduces voice "please place a document". During a time period from utterance end determination to a reproduction end of speech synthesis data, the display unit 128 performs control to cause the LED 180 to blink to notify the user that the voice control apparatus 100 is currently in a response voice reproducing state.

The response from the server 200 includes dialogue session continuance information indicating whether to continuously receive utterance from the user as a series of voice operations. If it is determined based on the dialogue session continuance information that utterance from the user is to be continuously received, the voice control unit 122 instructs the voice acquisition unit 124 to start processing, after the reproduction of response voice is completed. Thus, the user can perform a series of voice operations and voice instructions for the image formation apparatus 300 while having a natural speech dialogue, by continuously uttering What the user wants to do, without uttering a wake word again. In contrast, if it is determined based on the dialogue session continuance information that utterance from the user is not to be continuously received, the voice control unit 122 instructs the display unit 128 to cause the LED 180 to light out, and waits for the next operation start notification from the voice operation start detection unit 125. Hereinafter, a state until a next voice operation start instruction, such as a wake word, is received after a dialogue session ends will be referred to as a standby state.

<Functional Configuration of Voice Data Conversion Control Program of Server>

Figure 6:
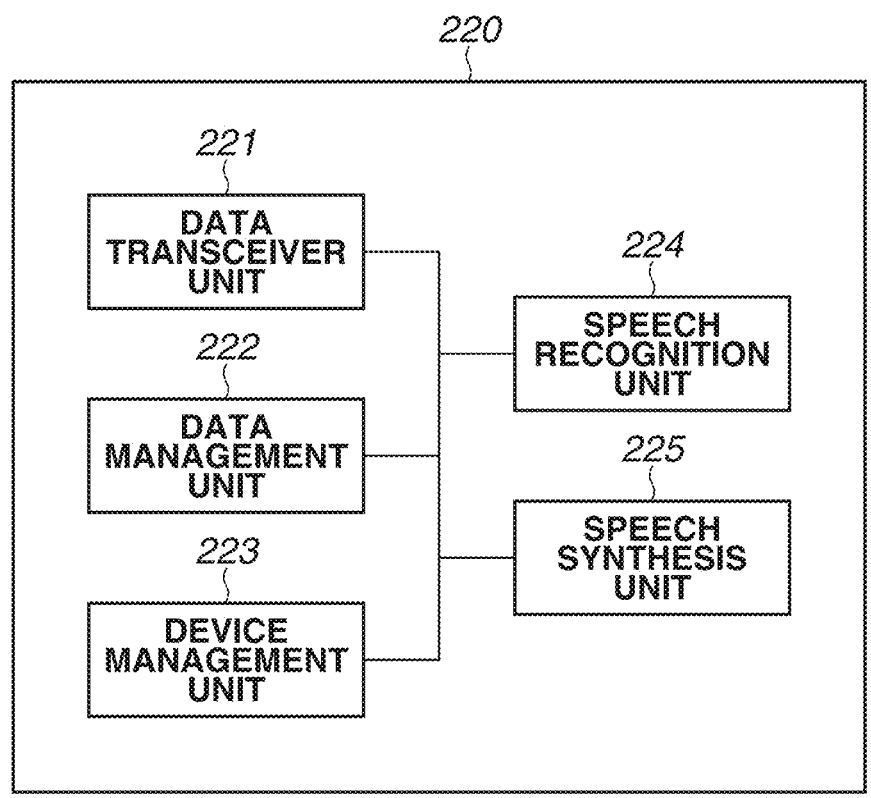
FIG. 6 is a conceptual diagram illustrating a functional configuration of a control program of the server.

FIG. 6 is a block diagram illustrating a functional configuration of a voice data conversion control program 220 of the server 200 that is to be executed by the CPU 211.

As described above, the voice data conversion control program 220 is stored in the ROM 213 or the external storage device 214, and loaded onto the RAM 212 when being executed by the CPU 211.

A data transceiver unit 221 performs, via the network OF 215, data transmission and reception with other devices connected to the network 10. For example, the data transceiver unit 221 receives voice data transmitted from the voice control apparatus 100. The data transceiver unit 221 transmits, to the image formation apparatus 300, operation intent data generated by a speech recognition unit 224 (described below). The data transceiver unit 221 receives response text data transmitted from the image formation apparatus 300. The data transceiver unit 221 transmits, to the voice control apparatus 100, speech synthesis data generated by a speech synthesis unit 225 (described below), and dialogue session continuance information received from the image formation apparatus 300.

A data management unit 222 stores various types of data to be used in the execution of the voice data conversion control program 220, into a predetermined region of the external storage device 214, and manages the stored data. For example, the data management unit 222 manages an acoustic model, a language model, and a vocabulary dictionary for converting received voice data into a text based on a speech recognition result. In addition, for example, the data manages 222 manages operation intent registration information (FIGS. 8A, 8B, 8C, 9A, 9B, 10A, 10B, 1.00, 11A, 11B, 12A, and 12B) to be used for generating operation intent data from the voice data or the text based on the speech recognition result. In addition, for example, the data management unit 222 manages a speech synthesis dictionary to be used for performing speech synthesis.

A device management unit 223 manages various types of information regarding the voice control apparatus 100, the image formation apparatus 300, and the client terminal 50 that communicate with each other via the network 10. For example, in a case where a single voice control apparatus 100 can communicate with a plurality of image formation apparatuses 300, the device management unit 223 manages a correspondence relationship between apparatuses that can perform communication. In addition, for example, the device management unit 223 performs centralized management of information (address book, job execution history, etc.) shared among the plurality of image formation apparatuses 300. In addition, for example, the device management unit 223 performs centralized management of user authentication information shared among apparatuses including the voice control apparatus 100, the image formation apparatus 300, and the client terminal 50.

The speech synthesis unit 225 performs speech synthesis based on response text data received by the data transceiver unit 221. In the speech synthesis, the speech synthesis unit 225 generates speech synthesis data by converting the response text data into a predetermined digital format (e.g., MP3, etc.) processable by the voice control apparatus 100, using the speech synthesis dictionary managed by the data management unit 222.

The speech recognition unit 224 performs speech recognition processing for converting voice data received by the data transceiver unit 221, into a text. At this time, the speech recognition unit 224 uses the acoustic model, the language model, and the vocabulary dictionary that are managed by the data management unit 222. Furthermore, the speech recognition unit 224 generates operation intent data from voice data or a text that is a speech recognition processing result. At this time, the speech recognition unit 224 uses the operation intent registration information managed by the data management unit 222.

For describing a specific example of operation intent data generation which is performed by the speech recognition unit 224, first of all, operation intent registration information will be described. The operation intent registration information includes an intent list and an entity list. The intent list is information defined for classifying operations that the user performs on the image formation apparatus 300, based on what the user utters. The intent list is classified by the type of an operation that the user performs on the image formation apparatus 300. A plurality of user utterance sentences can be defined for one intent, to treat different expressions for the same intent uttered by the user as the same operation. For example, "I want to make a copy" and "execute copy" which may be uttered by the user indicate the same operation, these sentences are predefined as one intent. The entity list is information defined for extracting a target and a value of a corresponding operation from a user utterance sample defined as an intent. A plurality of words having the same meaning can be defined for one entity.

FIGS. 8A, 8B, 8C, 9A, 9B, 10A, 10B, 10C each illustrate an example of an entity list managed by the data management unit 222. The entity list includes "Entity ID", "Value ID", and "Value" and "Synonyms". The "Entity ID" is an identifier indicating the type of a keyword extracted from an intent. The "Value ID" is an identifier of a value allocated to each entity. The "Value" is a representative word of a corresponding value, and the "Synonyms" define words having the same meaning (synonymous words) as a word defined as the "Value". The description in parentheses of the "Entity ID" in the drawings is supplementary information for describing details of each ID.

FIGS. 11A, 11B, 12A, and 12B each illustrate an example of an intent list managed by the data management unit 222. The intent list includes "Intent ID" and "Utterance", The "Intent ID" is an identifier indicating the type of an operation, which the user performs on the image formation apparatus 300. The "Utterance" defines another wording (utterance sample) meaning the same operation type. The "Utterance" can include the "Entity ID" defined in the entity lists illustrated in FIGS. 8A, 8B, 8C, 9A, 9B, 10A, 10B, and 10C.

Subsequently, a specific example in which the speech recognition unit 224 generates operation intent data using operation intent registration information will be described. The speech recognition unit 224 calculates a similarity between voice data (what the user has spoken) and items registered in an intent list and an entity list, by performing morphological analysis, syntax analysis, semantic analysis, and context analysis on voice data received by the data transceiver unit 221. The speech recognition unit 224 classifies voice data received by the data transceiver unit 221, into "Intent ID" having a similarity of a predetermined threshold value or more, and at the same time, extracts "Entity ID" and "Value ID" that are associated with the intent. FIGS. 13A, 13B, 13C, 1317, 13E, 13F, and 13G each illustrate an example of operation intent data generated by the speech recognition unit 224. The operation intent data includes one "Intent ID" and zero or one or more sets of "Entity ID" and "Value ID" ("Entities" in 13A, 13B, 13C, 13D, 13E, 13F, and 13G), which have been extracted from voice data through the above-described processing. The extracted "Intent ID", "Entity ID", and "Value ID" may include a similarity.

For example, if the data transceiver unit 221 receives voice data "I want to make a copy" uttered by the user, the speech recognition unit 224 generates operation intent data illustrated in FIG. 13A, through the above-described processing. For example, if the data transceiver unit 221 receives voice data "make three copies" uttered by the user, the speech recognition unit 224 generates operation intent data illustrated in FIG. 13B, through the above-described processing. For example, if the data transceiver unit 221 receives voice data "execute full-color duplex copy with top-left stapling by 10 copies" uttered by the user, the speech recognition unit 224 generates operation intent data illustrated in FIG. 13C, through the above-described processing. At this time, the speech recognition unit 224 can absorb a difference (inconsistency) between user utterance phrase and operation intent registration information using the acoustic model, the language model, and the vocabulary dictionary that are managed by the data management unit 222. A part or all of the functions provided by the speech recognition unit 224 are provided by a trained model (trained neural network).

<Functional Configuration of Device Control Program of Image Formation Apparatus>

Figure 7:
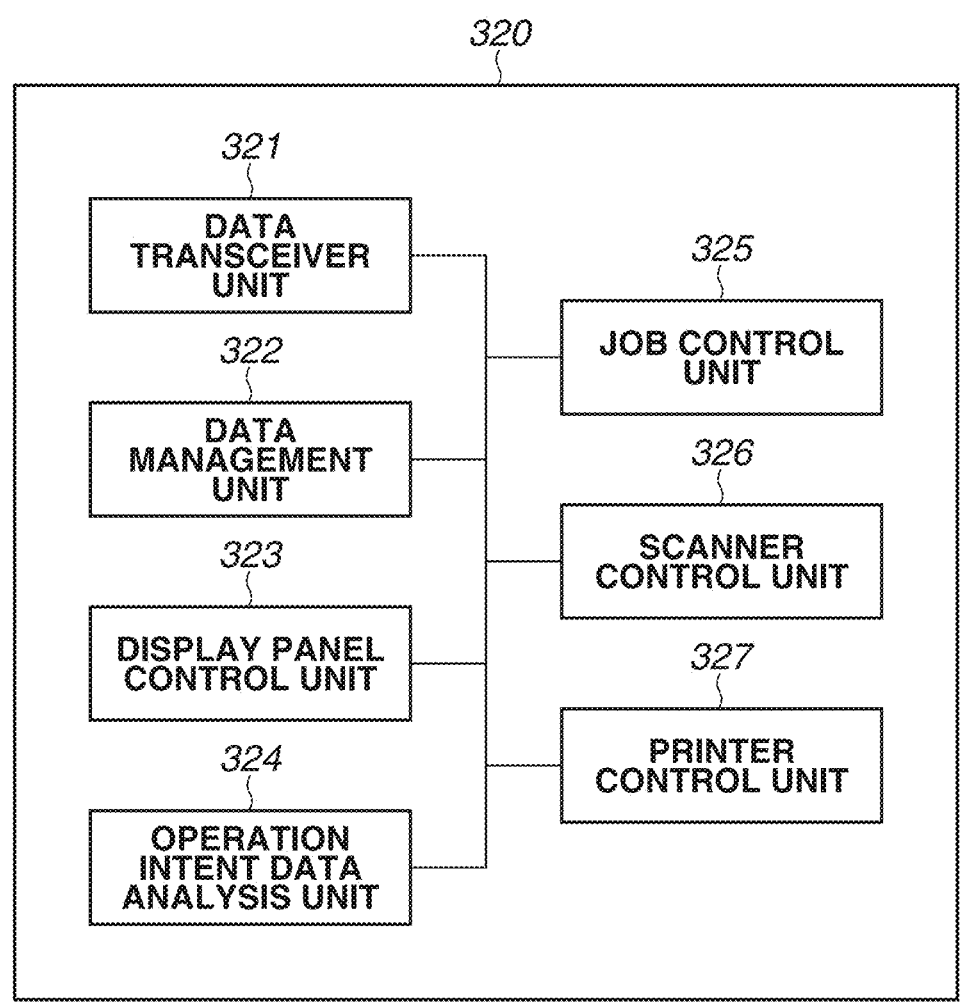
FIG. 7 is a conceptual diagram illustrating a functional configuration of a control program of the image formation apparatus.

FIG. 7 is a block diagram illustrating a functional configuration of a device control program 320 of the image formation apparatus 300 that is to be executed by the CPU 311.

As described above, the device control program 320 is stored in the ROM 313 or the external storage device 314, and loaded onto the RAM 312 when being executed by the CPU 311.

A data transceiver unit 321 performs, via the network I/F 315, data transmission and reception with other devices connected to the network 10. For example, the data transceiver unit 321 receives operation intent data transmitted from the server 200. The data transceiver unit 321 transmits, to the server 200, response text data indicating specifics of voice to be reproduced by the voice control apparatus 100. The data transceiver unit 321 receives a print job from the client terminal 50, and transmits scanned image data to the client terminal 50.

A data management unit 322 stores various types of data which is used in the execution of the device control program 320, into a predetermined region of the external storage device 314, and manages the stored data. For example, the data management unit 322 manages job data including setting items and image data with respect to jobs to be executed by a job control unit 325 to be described below, and authentication information required when communication is performed with the server 200.

A display panel control unit 323 controls, via the display controller 316, items to be displayed on a screen of the operation panel 360. The display panel control unit 323 interprets a user operation performed on the operation panel 360 via the operation I/F 317, and issues a job execution instruction (execution command) to the job control unit 325 or updates the items displayed on the screen of the operation panel 360. The display panel control unit 323 updates the items displayed on the screen of the operation panel 360 based on an instruction from an operation intent data analysis unit 324.

Based on the description of an instruction from the job control unit 325 to be described below, a scanner control unit 326 executes scanning using the scanner 380 via the scanner I/F 318, and stores read image data into the data management unit 322. The scanner control unit 326 holds various states of the scanner 380 via the scanner I/F 318.

A printer control unit 327 executes printing using the printer 390 via the printer I/F 319 based on the description of an instruction from the job control unit 325 to be described below. The printer control unit 327 holds various states of the printer 390 via the printer I/F 319.

In accordance with instruction from the display panel control unit 323 or the operation intent data analysis unit 324, the job control unit 325 executes a job based on the description of a job designated in the instruction. For example, in a copy job, the job control unit 325 performs control to cause the scanner control unit 326 to execute scanning and to cause the printer control unit 327 to print a scanned image onto a sheet. At this time, the job control unit 325 holds an execution status of a job being executed, and displays the execution status of the job on a screen of the operation panel 360 via the display panel control unit 323.

The operation intent data analysis unit 324 performs control based on the following various types of information: specifics of operation intent data received by the data transceiver unit 321; items displayed on the screen of the operation panel 360 of which the display is controlled by the display panel control unit 323 ("display state of screen"); an execution status of a job that is held by the job control unit 325 ("job execution status"); and various states of the scanner 380 that are held by the scanner control unit 326, and various states of the printer 390 that are held by the printer control unit 327 ("state of scanner/printer").

The "Intent ID" and the "Entity ID" that are included in operation intent data, and the "display state of screen", the "job execution status", and the "state of scanner/printer" are preliminarily associated with each other and managed. Control is performed based on information corresponding to the Intent ID" and the "Entity ID" that are included in the operation intent data.

For example, if the data transceiver unit 321 receives the operation intent data illustrated in FIG. 13A, it can be seen that the user has issued an instruction intending the execution of a copy job from the "Intent ID" indicating "Copy_Simple". At this time, the operation intent data analysis unit 324 determines whether the image formation apparatus 300 is in a copy job executable state. More specifically, the operation intent data analysis unit 324 acquires an execution status of a copy job from the job control unit 325. If there is no preceding copy job, or the scanning of a preceding copy job has already been completed, the operation intent data analysis unit 324 instructs the job control unit 325 to executes a copy job. As another example, if the data transceiver unit 321 receives the operation intent data illustrated in FIG. 13B, it can be seen that the user has issued an instruction intending the execution of a copy job from the "Intent ID" indicating "Copy_with_noc". Furthermore, it can also be seen that the user has issued an instruction to set the number of copies of the copy job, together with the execution of the copy job from the "Copy_with_noc". At this time, a value indicated by the "Value ID" with the "Entity ID" indicating "NUMBER" in the operation intent data is recognized as a setting command of the number of copies, and is set as a job parameter of a copy job.

If the operation intent data analysis unit 324 issues an instruction to execute a copy job, the operation intent data analysis unit 324 instructs the operation panel 360 to display a screen indicating an execution status of the copy job. The operation intent data analysis unit 324 generates response text data based on the above-described control result, and instructs the data transceiver unit 321 to transmit the generated response text data to the server 200. At this time, the operation intent data analysis unit 324 determines whether to continuously receive utterance from the user as a series of voice operations, and transmits the determination result to the server 200 as dialogue session continuance information together with the response text data. If utterance from the user is to be continuously received as a series of voice operations, the result of control performed by the operation intent data analysis unit 324 is stored, and the next control is performed in consideration of operation intent data received by the data transceiver unit 321 next, and the stored control result. For example, in response to receiving operation intent data intending the execution of a copy job, the operation intent data analysis unit 324 generates response text data for inquiring about whether to actually execute the copy job, without starting the execution of the copy job. At this time, the operation intent data analysis unit 324 stores information indicating that whether or not the copy job is executed is under inquiry, and job parameters of the copy job received so far as a series of voice operations. After that, when the operation intent data analysis unit 324 receives operation intent data indicating a response to the inquiry about the execution of the copy job, the operation intent data analysis unit 324 executes the copy job using the stored job parameters.

<Control Sequence of image Processing System>

Figure 14:
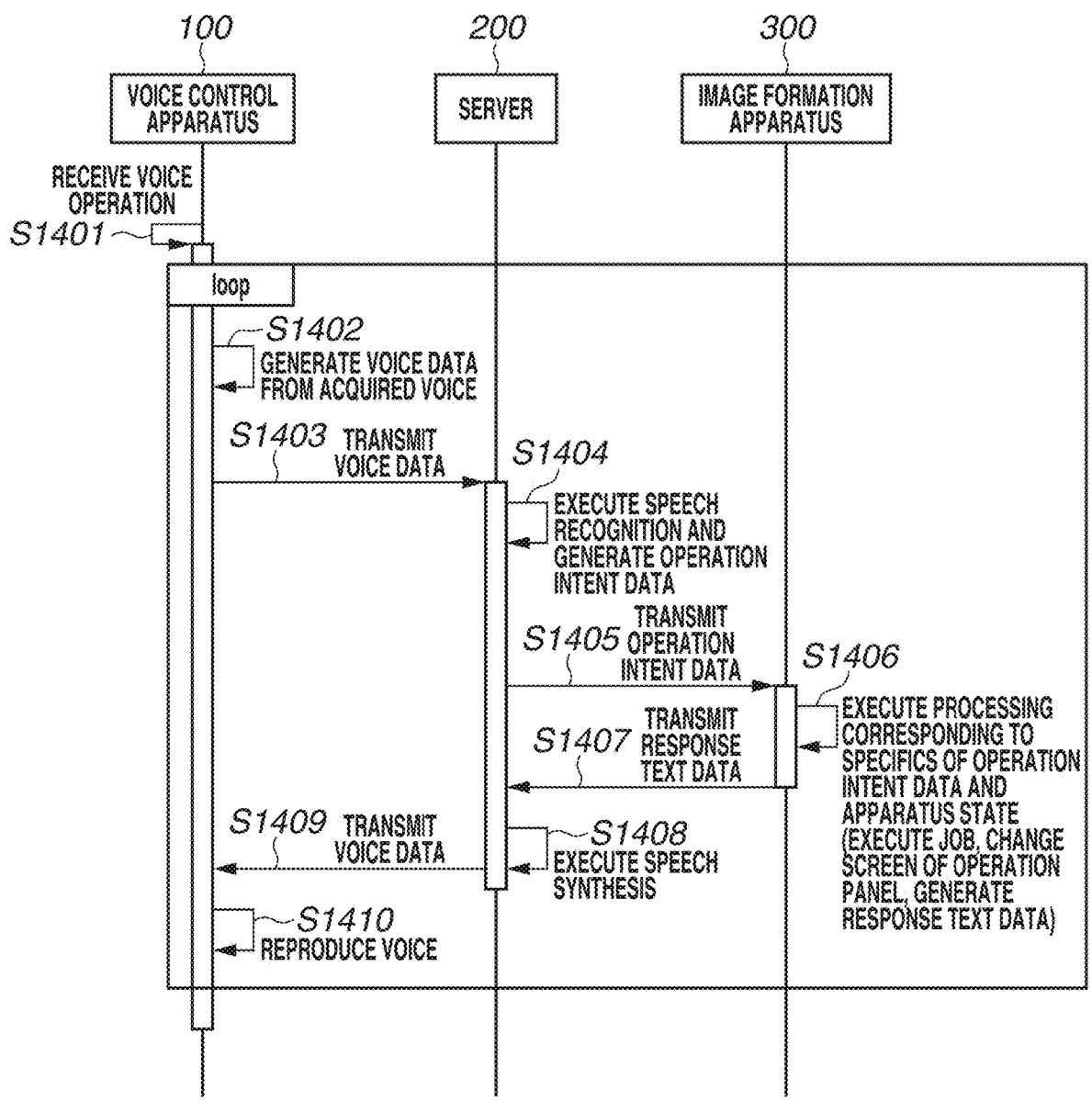
FIG. 14 is a sequence diagram illustrating processing performed between apparatuses included in a system.

FIG. 14 is a sequence diagram illustrating a flow of processing performed between the voice control apparatus 100, the server 200, and the image formation apparatus 300 that are included in the image processing system 1 illustrated in FIG. 1. FIG. 14 illustrates a series of flows of processing in which the voice control apparatus 100 receives a voice operation with voice uttered by the user and performs an operation and instruction to the image formation apparatus 300 based on the voice operation, and the voice control apparatus 100 makes a voice response (announcement) indicating the result.

First of all, in step S1401, the voice control apparatus 100 starts the reception of a voice operation from the user. More specifically, as in the above description, in response to the voice operation start detection unit 125 detecting a wake word uttered by the user, the voice acquisition unit 124 starts the acquisition of voice uttered by the user subsequently to the wake word, as described above.

In step S1402, the voice control apparatus 100 generates voice data in a predetermined digital format from analog voice of the user that has been acquired by the voice acquisition unit 124. As in the above description, the acquisition of analog voice of the user in step S1402 is continuously performed until the utterance end determination unit 126 determines that voice uttered by the user ends.

In step S1403, the voice control apparatus 100 transmits the voice data generated in step S1402, to the server 200. At this time, voice data may be transmitted to the server 200 after all pieces of voice data may be generated in step S1402, from voice uttered by the user until the end of utterance is detected. Alternatively, voice data may be transmitted to the server 200 each time voice data is generated in step S1402 in a predetermined unit.

In step S1404, the server 200 receives, by the data transceiver unit 221, the voice data transmitted from the voice control apparatus 100 in step S1403, and generates operation intent data by performing speech recognition on the received voice data by using the speech recognition unit 224.

In step S1405, the server 200 transmits the operation intent data generated in step S1404, to the image formation apparatus 300.

In step S1406, the image formation apparatus 300 receives, via the data transceiver unit 321, the operation intent data transmitted from the server 200 in step S1405, and analyzes the received operation intent data through the operation intent data analysis unit 324. At this time, as in the above description, the operation intent data analysis unit 324 performs processing depending on the specifics of the received operation intent data, the items displayed on a screen of the operation panel 360, an execution status of a job, and the state of the scanner 380 and/or the printer 390. For example, the operation intent data analysis unit 324 instructs the job control unit 325 to execute a job associated with the specifics of the operation intent data. In accordance with the specifics of the operation intent data, the operation intent data analysis unit 324 instructs the display panel control unit 323 to display a predetermined screen on the operation panel 360. In accordance with the specifics of the operation intent data, the operation intent data analysis unit 324 generates response text data for returning a response message to the user by voice. At this time, as in the above description, the operation intent data analysis unit 324 generates dialogue session continuance information indicating whether to continuously receive utterance from the user as a series of voice operations. If utterance from the user is to be continuously received as a series of voice operations, the operation intent data analysis unit 324 stores a result of control performed by the operation intent data analysis unit 324 so far as a series of voice operations. After that, the operation intent data analysis unit 324 also performs processing depending on the stored control result.

In step S1408, the server 200 receives, via the data transceiver unit 221, the response text data transmitted from the image formation apparatus 300 in step S1407, and generates speech synthesis data by the speech synthesis unit 225.

In step S1409, the server 200 transmits, to the voice control apparatus 100, the speech synthesis data generated by the speech synthesis unit 225, and the dialogue session continuance information received by the data transceiver unit 221.

In step S1410, the voice control apparatus 100 receives, by the data transceiver unit 121, the speech synthesis data transmitted from the server 200 in step S1409, and reproduces the speech synthesis data through the voice reproduction unit 127 using the speaker 170. Furthermore, if it is determined based on the dialogue session continuance information received by the data transceiver unit 121 that utterance from the user is to be continuously received, the voice control apparatus 100 repeats the operation in step S1402 and the subsequent operations. In contrast, if it is determined based on the dialogue session continuance information that utterance from the user is not to be continuously received, the voice control apparatus 100 ends reception of utterance from the user, and stays in a standby state until the voice operation start detection unit 125 detects a next wake word.

<Processes of Performing Job Execution Permission Confirmation>

Figure 15:
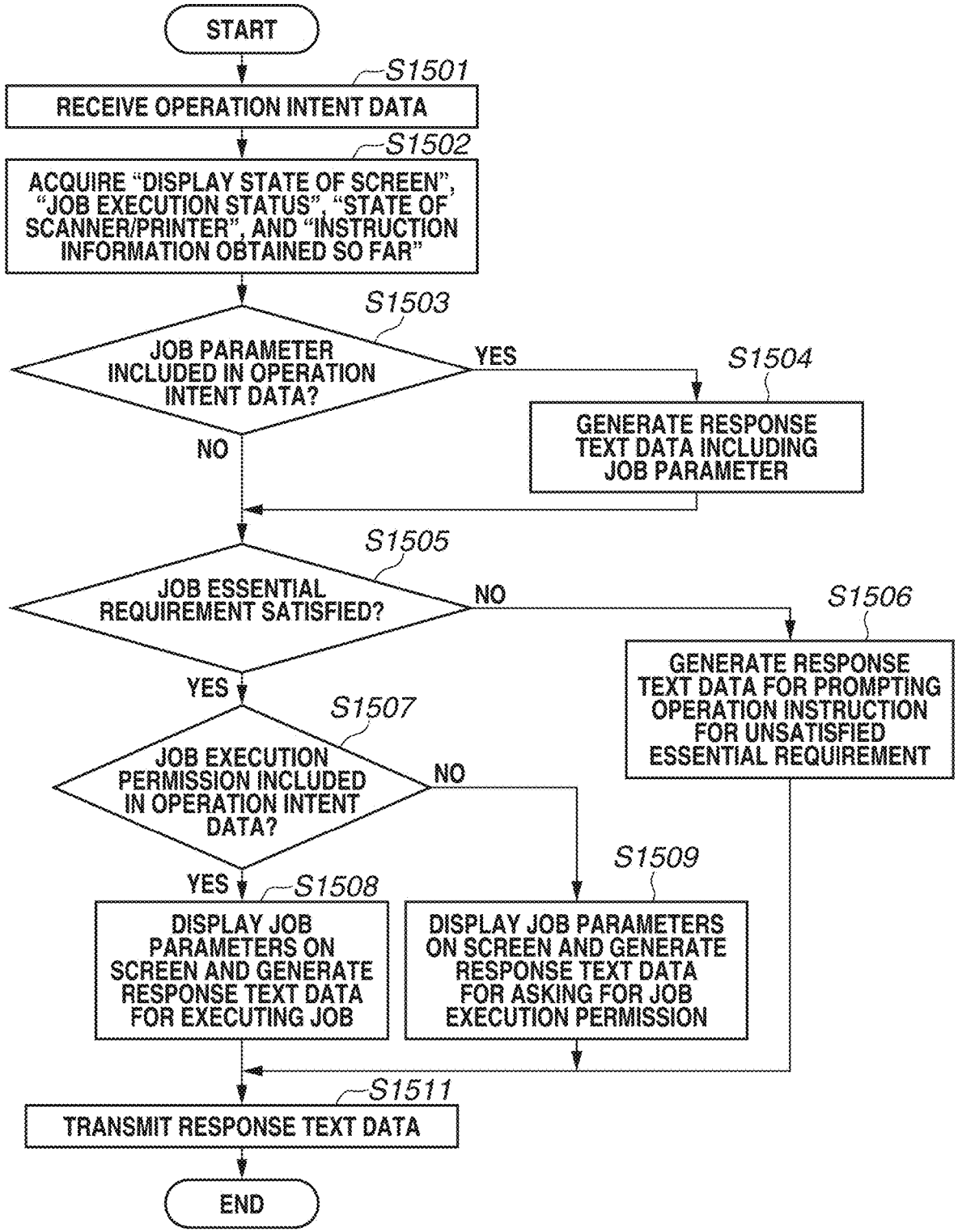
FIG. 15 is a flowchart illustrating partial processing of a control program of the image formation apparatus.

FIG. 15 illustrates a flowchart of the details of the process in step S1406. The flowchart illustrated in FIG. 15 indicates partial processing implemented by the device control program 320 of the image formation apparatus 300.

The processing illustrated in this flowchart is executed by the controller unit 310. More specifically, the control illustrated in the flowchart is implemented by the CPU 311 loading a program stored in the ROM 313, into the RAM 312, and executing the program.

Initially, in response to receiving operation intent data transmitted from the server 200 in step S1405, in step S1501, the data transceiver unit 321 receives the operation intent data.

Next, in step S1502, the operation intent data analysis unit 324 analyzes the specifics of the operation intent data received by the data transceiver unit 321, and acquires various types of information in the image formation apparatus 300 that are related to the specifics.

Various types of information in the image formation apparatus 300 include the items displayed on a screen of the operation panel 360 of which the display is controlled by the display panel control unit 323, for example ("display state of screen" in FIG. 15), an execution status of a job that is held by the job control unit 325 ("job execution status" in FIG. 15), various states of the scanner 380 that are held by the scanner control unit 326, and various states of the printer 390 that are held by the printer control unit 327 ("state of scanner/printer" in FIG. 15).

The operation intent data analysis unit 324 acquires "instruction information obtained so far". The "instruction information obtained so far" refers to session continuance information taken over from voice operations or touch panel operations performed so far. For example, the "instruction information obtained so far" corresponds to dialogue session continuance information for continuously receiving utterance from the user as a series of voice operations, information indicating that the image formation apparatus 300 has asked the user a question and is in a response waiting state, and recording and readout information about job parameters, such as the number of copies. Thus, at the beginning of a session, the "instruction information obtained so far" indicates "none".

If the operation intent data analysis unit 324 determines that an operation intended in operation intent data is to be received, in step S1503, the operation intent data analysis unit 324 determines whether information regarding a job parameter is included in newly-received data.

The determination is made based on whether the intent lists illustrated in FIGS. 11A, 11B, 12A, and 12B include a predetermined "Entity ID" registered in "Utterance" of "Intent ID". For example, for an intent with "Intent ID" indicating "Copy_with_noc", "Entity ID" indicating "NUMBER" included in the corresponding "Utterance" is preregistered as a job parameter. If the operation intent data illustrated in FIG. 13B is received, "Intent ID" indicates "Copy_with_noc," and furthermore, "Entity ID" indicating "NUMBER" is included. The operation intent data analysis unit 324 thus determines that information relating to the job parameter is included in the received data.

For example, an intent having "Intent ID" indicating "Copy_simple" in FIGS. 11A and 11B intends that the user issues a copy instruction without a job parameter setting. Thus, if the operation intent data illustrated in FIG. 13A is received, the operation intent data analysis unit 324 determines that information relating to the job parameter is not included in the received data.

Information indicating whether each "Entity ID" included in the intent lists illustrated in FIGS. 11A, 11B, 12A, and 12B is a job parameter is preliminarily managed by the operation intent data analysis unit 324. Using the information, it is determined whether information the job parameter is included in the received data.

If information relating to the job parameter is included in the received data (YES in S1503), in step S1504, response text data including the job parameter is subsequently generated.

For example, if the operation intent data illustrated in FIG. 13B is received, the controller unit 310 generates response text data indicating that a value indicated by "Value ID" with "Entity ID" indicating "NUMBER" which is a job parameter is set as the number of copies. For example, the controller unit 310 generates response text data indicating that "the number of copies is set to 10."

In step S1505, the operation intent data analysis unit 324 performs determination based on various types of information in the image formation apparatus 300 that have been acquired in step S1502, and the job parameter acquired in step S1504. More specifically, the operation intent data analysis unit 324 determines whether an essential requirement for executing a job intended in the analyzed operation intent data is satisfied, based on these pieces of information.

For example, if the scanning of a preceding copy job is being executed (specific device state), a requirement of "scan available" is not satisfied. The operation intent data analysis unit 324 therefore determines that a copy job intended by the operation intent data cannot be executed. The details of essential requirement determination will be described below.

If the operation intent data analysis unit 324 determines that the job cannot be executed (NO in step S1505), the processing proceeds to step S1506. In step S1506, the operation intent data analysis unit 324 generates response text data. The response text data is data for reproducing voice prompting the user to issue an operation instruction for an unsatisfied essential requirement.

For example, it is assumed that the operation intent data analysis unit 324 acquires, from the job control unit 325, information indicating, that the scanning of a preceding copy job is being executed. If the scanning is being executed, the requirement of "scan available" is not satisfied. The operation intent data analysis unit 324 therefore determines that the copy job intended in the operation intent data cannot be executed. At this time, response text data indicating "please wait until preceding copy ends" is generated.

In contrast, if the operation intent data analysis unit 324 determines that an essential requirement for executing a job intended in analyzed operation intent data is satisfied (YES in step S1505), the processing proceeds to step S1507. In step S1507, the operation intent data analysis unit 324 determines whether a job execution permission has been confirmed. The details of execution permission confirmation will be described below.

The operation intent data analysis unit 324 includes the function of storing information indicating whether to execute a job is under inquiry. If execution permission confirmation of the job has not been completed yet (NO in step S1507), the processing proceeds to step S1509. In step S1509,
the operation intent data analysis unit 324 instructs the operation panel 360 to display a screen including the job parameters included in operation intent data. Along with the instruction, the operation intent data analysis unit 324 generates response text data used for asking for execution permission of a job.

Figure 16:
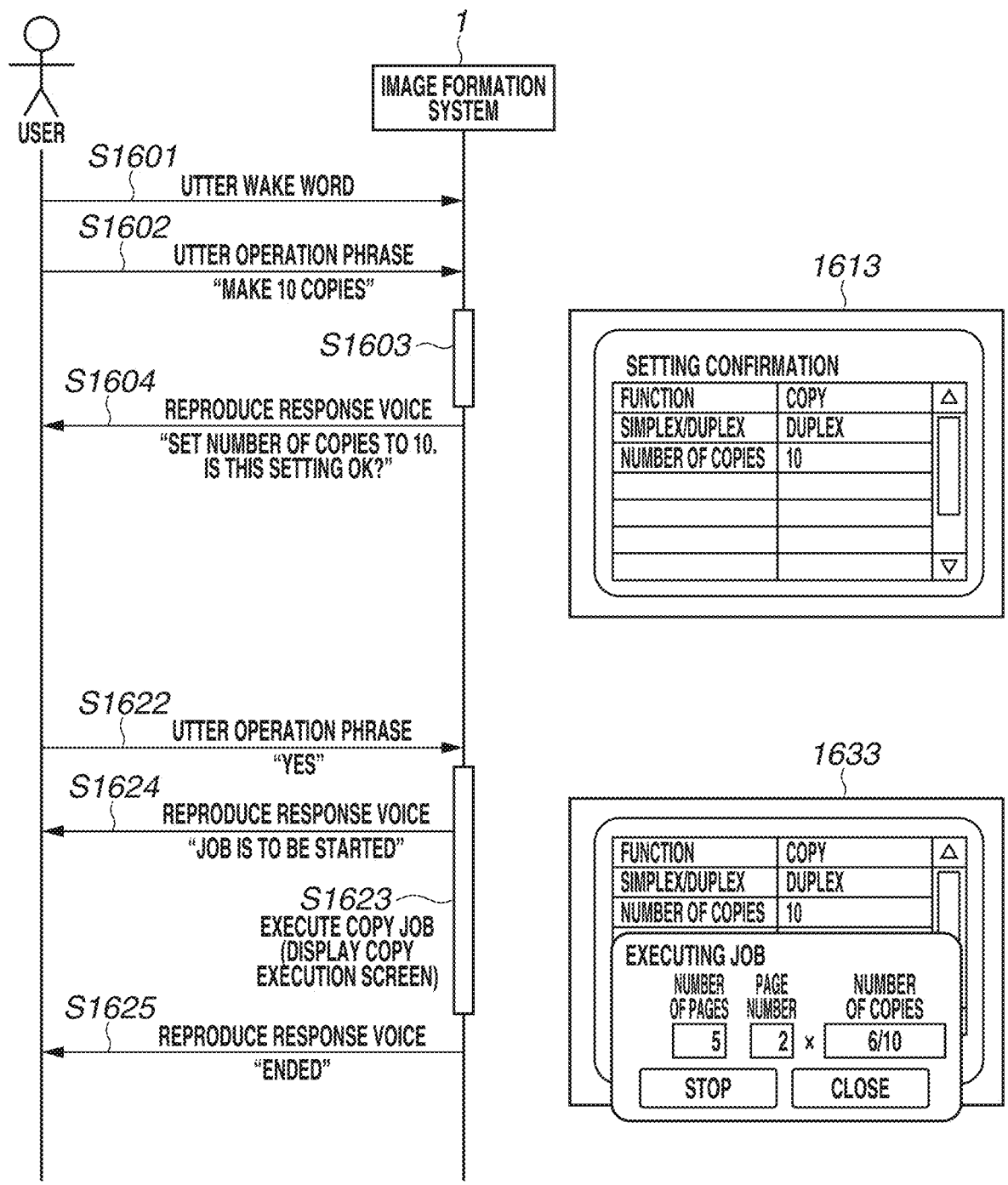
FIG. 16 is a sequence diagram illustrating an example of an operation which is performed between a system and a user.

For example, if the operation intent data illustrated in FIG. 13B is received, a screen including the setting value of "NUMBER" and the item of "Paper Side" of "Entity ID", which are preliminarily managed as job parameters, is displayed, More specifically, a list of items and setting values for a job parameter indicated by "Entity ID" or "Value ID" is displayed on a screen (e.g., job parameter setting preference confirmation screen 1613 which is illustrated in FIG. 16, described below). At the same time, the operation intent data analysis unit 324 generates response text data "is this selling OK?".

If the user utters a response other than "Yes" in response to an execution inquiry, in step S1509, the operation intent data analysis unit 324 does not perform control for starting the job.

If the user utters a response "Yes" in response to an execution inquiry (YES in step S1507), the processing proceeds to step S1508. In step S1508, the operation intent data analysis unit 324 performs control such that the job is started. At this time, the operation intent data analysis unit 324 performs control such that a job execution status display screen is displayed on the operation panel 360 and that the job is executed (e.g., job parameter setting preference confirmation screen 1633 to be described below). In step S1508, the operation intent data analysis unit 324 generates response text data "the job is to be started".

Lastly, in step S1511, the operation intent data analysis unit 324 combines a series of response text data generated in steps S1504, S1506, S1508, and step S1509, and transmits the combined response text data to the server 200 via the data transceiver unit 321.

Detailed Description of Essential Requirement Determination According to First Exemplary Embodiment The details of essential requirement determination which is performed in the processing in step S1505 will be described. FIG. 22A is a diagram illustrating a data table used for execution essential requirement designation for each job according to the first exemplary embodiment. In the first exemplary embodiment, it is determined whether an "essential" requirement for executing a job is satisfied based on this data table.

The requirement items include items related to "state of scanner/printer" and items related to "job parameters". In FIG. 22A, "scan available", "print available", "print sheet", and "document set" are items related to "state of scanner/printer". In FIG. 22A, "designation of the number of copies", "designation of print duplex", "designation of document duplex", "designation of destination", and "designation of color" are items related to "job parameters". There are three types of attributes including "necessary", "unnecessary", and "optional" as data designated for these items.

An item for which "necessary" is designated is an item for which a requirement for the item needs to be satisfied for executing a job.

An item for which "unnecessary" is designated is an item not affecting the execution of a job, or an item unrelated to the execution of a job.

An item for which "optional" is designated is an item that affects the execution of a job but a requirement needs not be necessarily satisfied. An item for which "optional" is designated in the present exemplary embodiment is an item related to "job parameters", and an item for which a setting initial value (default value, recommended value) can be used. If a setting instruction (input of setting command) for an item for which "optional" is designated is not provided together with an execution instruction for a job, a setting initial value is used for the execution of the job. FIG. 22C is a diagram illustrating a data table of a default value of each job according to the first exemplary embodiment. In FIG. 22C, a value input for each item indicates a default setting value, and "–" indicates that a default setting value is not set. The use of the data table is not limited to the process during a voice operation, and the values in the data table can be used as default parameters in job execution. Alternatively, the data table may be managed as a data table applied only to the process during a voice operation.

The structure of the data table illustrated in FIG. 22A will be described using an example case where "Intent ID" included in the operation intent data illustrated in FIGS. 12A and 12B indicates "Copy_simple". On the column of "copy instruction" in FIG. 22A, "necessary" is designated for four items including "scan available", "print available", "print sheet", and "document set". In addition, "optional" is designated for four items including "designation of the number of copies", "designation of print duplex", "designation of document duplex", and "designation of color". In addition, "unnecessary" is designated for two items including "FAX line" and "designation of destination". This indicates that it is "necessary" to satisfy the requirements of "scan available", "print available", "print sheet", and "document set" for "copy instruction". This also indicates that the requirements of "designation of the number of copies", "designation of print duplex", "designation of document duplex", and "designation of color" affect the specifics of job content, but need not necessarily satisfied. This also indicates that the requirements of "FAX line" and "designation of destination" do not affect the job.

Execution Permission Confirmation According to First Exemplary Embodiment

The execution permission confirmation will be described, FIG. 22B is a diagram illustrating an example of a setting data table used for execution permission confirmation for each job according to the first exemplary embodiment. In the present exemplary embodiment, confirmation of job execution permission is supposed to be performed for all types of jobs. Thus, "confirm" is designated for all types of jobs in FIG. 22B.

The confirmation is performed by using a confirmation question indicated by display or voice, and a positive response to the confirmation question that is provided by the user. For example, the confirmation is performed by voice "OK?" emitted by an apparatus and a user voice input response "Yes" provided immediately after the voice. The response "Yes" corresponds to "Intent ID" {Yes} (not illustrated).

Curly brackets "{ }" serve as a delimiter for an information item unit, and are used for indicating an item label or specifics put in the curly brackets.

Sequence Example A (FIG. 16) of Copy According to First Exemplary Embodiment FIG. 16 is a sequence diagram illustrating an example of a speech dialogue performed between the image processing system 1 and the user in a series of voice operations in the present exemplary embodiment, and operations of the image processing system 1 that are performed at the time.

In step S1601, the user utters a wake word to the image processing system 1. Thus, a series of voice operations is started.

In step S1602, subsequently to the wake word, the user utters a phrase relating to an operation that the user wants to perform using the image processing system 1. In this example, the user utters "make 10 copies".

In step S1603, an image processing system 1 performs processing in accordance with the user utterance received in step S1602. At this time, in response to the user utterance "make 10 copies", the server 200 in the image processing system 1 generates the operation intent data illustrated in FIG. 13B, and transmits the generated operation intent data to the image formation apparatus 300. In response to receiving the operation intent data, the image formation apparatus 300 executes the processing illustrated in the processing in FIG. 15 once. Consequently, in step S1604, the job parameter setting preference confirmation screen 1613 including the job parameters is displayed on the operation panel 360. Along with the display, in step S1604, the image processing system 1 reproduces response voice "the number of copies is set to 10. Is this setting OK?".

In step S1622, the user continuously utters a phrase relating to the operation that the user wants to perform using the image processing system 1. In this example, in step S1622, the user utters "Yes" indicating a response to the inquiry made in step S1604.

In step S1623, the image processing system 1 performs processing in accordance with the user utterance phrase received in step S1622. The server 200 in the image processing system 1 generates operation intent data, and transmits the generated operation intent data to the image formation apparatus 300. In response to receiving the operation intent data, the image formation apparatus 300 executes the processing illustrated in the processing in FIG. 15 again (second time), Consequently, in step S1623, the job parameter setting preference confirmation screen 1633 including the job parameters is displayed on the operation panel 360, and the copy job is executed. Along with the display, in step S1624, the image processing system 1 reproduces response voice "a job is to be started".

After that, in response to an execution end of the copy job in the image processing system 1, in step S1625, the image processing system 1 reproduces voice "ended", and ends the series of voice operations.

Processing of Control Program in FIG. 16 (Sequence Example A) According to First Exemplary Embodiment In step S1603 in FIG. 16, the operation intent data analysis unit 324 executes the processing in FIG. 15. After that, in step S1623, the operation intent data analysis unit 324 executes the processing in FIG. 15 again. The processing to be performed for the first time in step S1603 will be operated as follows.

In step S1501, the controller unit 310 receives new information, namely, {copy} and {the number of copies}.

In step S1502, the controller unit 310 acquires information, namely, {scan available}, {print available}, {print sheet}, and {document set}.

In step S1503, the controller unit 310 determines that the job parameters {copy} and {the number of copies} are included in the received data (YES in step S1503).

In step S1504, the controller unit 310 generates a response text message indicating that "the number of copies is set to 10".

In step S1505, the controller unit 310 confirms whether the all items of "scan available", "print available", "print sheet", and "document set" on the column of "copy instruction" in FIG. 22A are satisfied in the information acquired in step S1502, and determines that essential items are satisfied (YES in step S1505).

In step S1507, since "instruction information obtained so far" does not include information, {under inquiry about job execution permission}, the controller unit 310 determines that an execution permission has not been confirmed.

In step S1509, the controller unit 310 instructs the operation panel 360 to display the job parameter setting preference confirmation screen 1613 including the job parameters. The controller unit 310 also generates a response text message indicating that "is this setting OK?".

In step S1603, the operation intent data analysis unit 324 generates dialogue session continuance information for continuously receiving utterance from the user as a series of voice operations. The operation intent data analysis unit 324 stores information, namely, {copy}, {10 copies}, and {under inquiry about job execution permission}. Thus the operation intent data analysis unit 324 can take over operation intent data to a next control program processing. The processing in step S1623 for the second time is performed as follows.

In step S1501, the controller unit 310 receives new information of {Yes}.

In step S1502, the controller unit 310 acquires {scan available}, {print available}, {print sheet}, {document set}, {copy}, {10 copies}, and {under inquiry about job execution permission}.

In step S1503, the controller unit 310 determines that there is "no" newly-received job parameter (NO in step S1503).

In step S1505, the controller unit 310 determines again that essential requirements are satisfied (YES in step S1505).

In step S1507, since the above-described both pieces of information, namely, {under inquiry about job execution permission} and {Yes} are included, the controller unit 310 determines that an execution permission has been confirmed (YES in step S1507).

In step S1508, the controller unit 310 instructs the operation panel 360 to display the job parameter setting preference confirmation screen 1633 including the job parameters, and also issues an execution instruction for a copy job.

Figure 17:
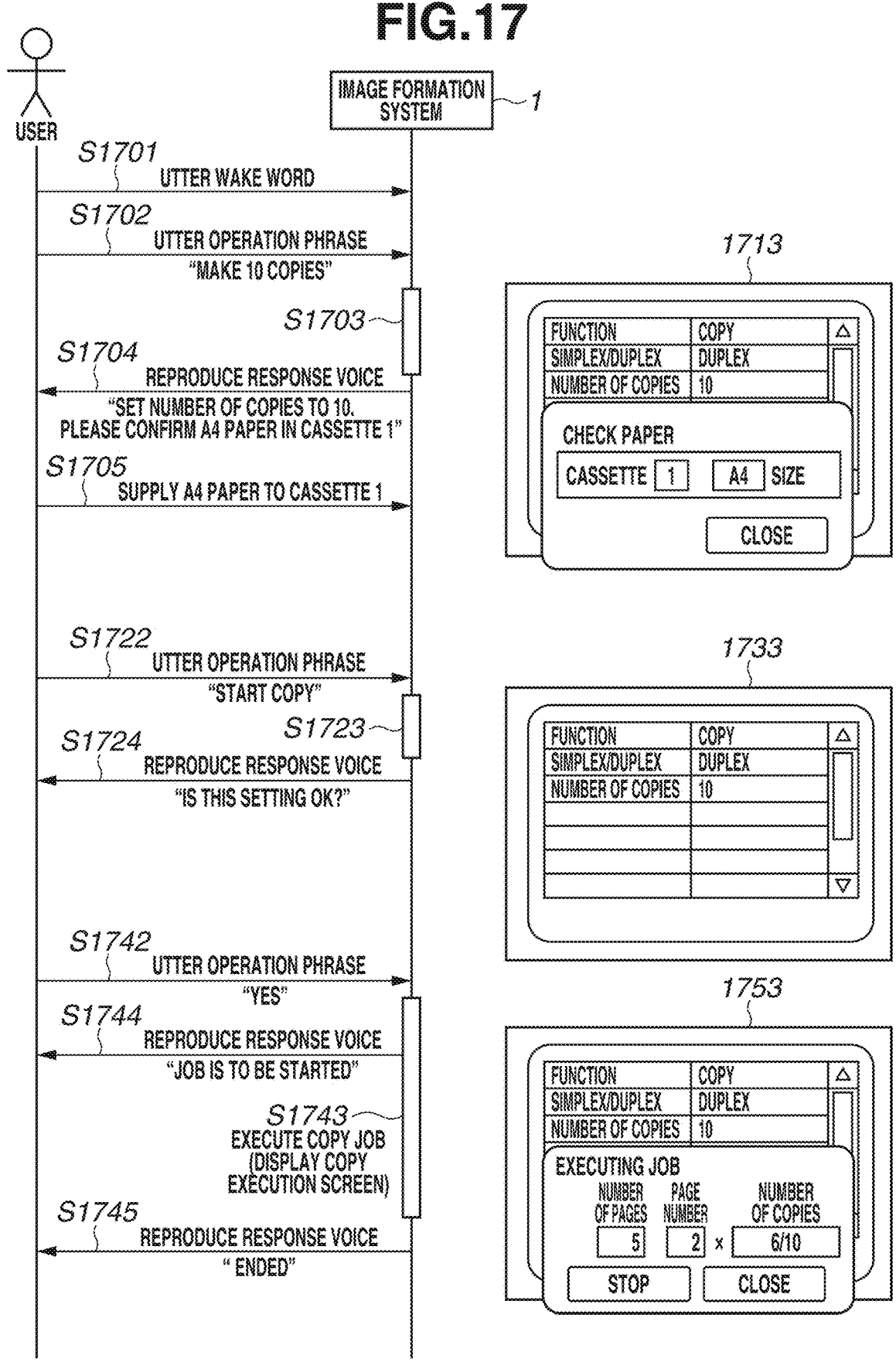
FIG. 17 is a sequence diagram illustrating an example of an operation which is performed between a system and a user.

Sequence Example B (FIG. 17) According to First Exemplary Embodiment when Copy Sheet is Running Short FIG. 17 is a sequence diagram illustrating another example of a speech dialogue performed between the image processing system 1 and the user in a series of voice operations in the present exemplary embodiment, and operations of the image processing system 1 that are performed at the time.

In step S1701, the user utters a wake word to the image processing system 1. Thus a series of voice operations is started.

In step S1702, subsequently to the wake word, the user utters a phrase relating to the operation that the user wants to perform using the image processing system 1. In this example, the user speaks "make 10 copies".

In step S1703, the image processing system 1 performs processing in accordance with the user utterance phrase received in step S1702. At this time, in response to the user utterance "make 10 copies", the server 200 in the image processing system 1 generates the operation intent data illustrated in FIG. 13B, and transmits the generated operation intent data to the image formation apparatus 300. In response to receiving the operation intent data, the image formation apparatus 300 executes the processing illustrated in the flowchart in FIG. 15 once.

At this time, it is assumed that prepared sheets, such as A4 sheets in a "cassette 1", that are to be used for the copy job are insufficient (running short). In such a case, the image processing system 1 displays a screen 1713 including the job parameters, on the operation panel 360. In step S1704, the image processing system 1 reproduces response voice "the number of copies is set to 10. Please check A4 paper in the cassette 1", as response voice of the image processing system 1.

At this time, in step S1705, the user supplies A4 sheets to the "cassette 1" Subsequently, in step S1722, the user speaks "start copy".

In step S1723, the image processing system 1 performs processing in accordance with the user utterance phrase received in step S1722. The server 200 in the image processing system 1 generates the operation intent data illustrated in FIG. 13A, and transmits the generated operation intent data to the image formation apparatus 300. In response to receiving the operation intent data, the image formation apparatus 300 executes the processing illustrated in the flowchart in FIG. 15 again (second time). Consequently, in step S1723, the image processing system 1 controls the operation panel 360 to display a job parameter setting preference confirmation screen 1733. In step S1724, the image processing system 1 reproduces response voice "is this setting OK?".

In response to this, in step S1742, the user utters "Yes" indicating a response to the inquiry.

In step S1743, the image processing system 1 performs processing in accordance with the user utterance phrase received in step S1742, The server 200 in the image processing system 1 generates operation intent data, and transmits the generated operation intent data to the image formation apparatus 300. In response to receiving the operation intent data, the image formation apparatus 300 executes the processing illustrated in the flowchart in FIG. 15 again (third time).

Consequently, in step S1743, the image processing system 1 displays a screen 1753 including the job parameters, on the operation panel 360. The image processing system 1 executes a copy job. In step S1744, the image processing system 1 reproduces response voice "the job is to be started.", which is response voice of the image processing system 1.

After that, if the execution of the copy job ends in the image processing system 1, in step S1745, the image processing system 1 reproduces voice "ended", and ends the series of voice operations.

Processing of Control Program in Sequence Example B (FIG. 17) According to First Exemplary Embodiment In the sequence example illustrated in FIG. 17, the operation intent data analysis unit 324 sequentially executes the processing in FIG. 15 in three steps including steps S1703, S1723, and S1743. In this sequence, the process to be performed for the first time in step S1703 is different from the processing in the example in FIG. 16 is performed.

In step S1501, the controller unit 310 receives new information which is {10 copies} and {copy}.

In step S1502, the controller unit 310 acquires information, namely, {scan available}, {print available}, and {document set}, "A4 sheets prepared in the cassette 1 being insufficient".

In steps S1503 and S1504, the controller unit 310 sets job parameters to {10 copies} and {copy} based on the received data. In step S1504, the controller unit 310 generates a response text message indicating that "the number of copies is set to 10."

In step S1505, since the item "print sheet" on the column of "copy instruction" in FIG. 22A is unsatisfied, the controller unit 310 determines that an essential item is unsatisfied in step S1505).

The controller unit 310 instructs the operation panel 360 to display the screen 1713 including the job parameters. In step S1506, the controller unit 310 generates a response text message indicating that "please check A4 paper in the cassette 1". Furthermore, the controller unit 310 generates dialogue session continuance information, and stores information, {copy} and {10 copies}.

In step S1723, the controller unit 310 executes the process for the second time as follows.

In step S1501, the controller unit 310 receives new information, namely, {copy}.

In step S1502, the controller unit 310 acquires information, namely, "A4 sheets prepared in the cassette 1 being sufficient" {print sheet}, {10 copies}, and {copy}.

In steps S1503 and S1504, the controller unit 310 overwrites "instruction information obtained so far" with the newly-received job parameter {copy}.

In step S1505, the controller unit 310 determines that essential items are satisfied (YES in step S1505).

In step S1507, since the "instruction information obtained so far" does not include {under inquiry about job execution permission}, the controller unit 310 determines that an execution permission has not been confirmed (NO in step S1507).

In step S1509, the controller it 310 instructs the operation panel 360 to display the job parameter setting preference confirmation screen 1733 including the job parameters. The controller unit 310 generates a response text message indicating that "is this setting OK?". The controller unit 310 stores information, {copy}, {10 copies}, and {under inquiry about job execution permission}.

The operations in step S1743 and the subsequent steps for the third time function as in step S1623 and the subsequent steps in the processing to be secondly performed in FIG. 16. Thus, descriptions thereof will be omitted.

<Remarks>

As described above, according to the first exemplary embodiment, a number of job parameters can be acquired from a series of utterances (one utterance) of the user. A list of a number of job parameters is displayed on a screen, and thus, the user can confirm the list of job parameters designated by voice, which is excellent in usability.

According to the first exemplary embodiment, it can be determined whether a command essential to the execution of a job is included in commands acquired from a series of utterances of the user. The phrase of a voice response (announcement) is changed based on the result of the determination. In this manner, since an appropriate response is provided based on an amount of information obtained from the user, the number of dialogues performed between the image processing system 1 and the user can be prevented from becoming redundant.

According to the first exemplary embodiment, if a command (execution command) for a permission of executing a job (execution instruction) is acquired from a series of utterances of the user in addition to a command (setting command) of a setting change, the execution of the job can be started. If a command for a setting change has been acquired from a series of utterances of the user while a command for the permission of executing the job (execution instruction) has not been acquired, a notification asking for the permission of executing the job is provided. In such a manner, depending on whether the permission of executing the job is included in a series of utterances of the user, processing can be changed, which is excellent in usability. To obtain this effect, the operation in step S1505 is not essential. For example, the operation in step S1507 may be executed without performing the determination in step S1505.

A second exemplary embodiment of the present invention will be described below. In the first exemplary embodiment, the description has been provided of an example in which predefined values are used for requirement items used in essential requirement determination, the setting of execution permission confirmation, and default job parameters. In the second exemplary embodiment, the description will be provided of an example in which at least part of requirement items used in essential requirement determination, the setting of execution permission confirmation, and default job parameters are made changeable. The other configurations excluding the configurations to be described as features are similar to those in the first exemplary embodiment. Thus, similar configurations are assigned the same reference numerals and detailed descriptions thereof will be omitted.

Detailed Description of Essential Requirement Determination According to Second Exemplary Embodiment FIG. 23A is a diagram illustrating an example of a data table of execution essential requirement designation for each job according to the second exemplary embodiment.

In the present exemplary embodiment, as requirements essential to execution, in FIG. 23A, a requirement for storage authentication and a requirement for network authentication are added as compared with FIG. 22A. The requirement for storage authentication is a requirement related to "Store Operation", and the requirement for network authentication is a requirement related to "Fax Operation". More detailed control can be performed by adding these requirements.

In the present exemplary embodiment, as illustrated in FIG. 23A, as attributes that can be designated for each item, attributes "<necessary>" and "<optional>" are included in addition to attributes "necessary" and "unnecessary".

The attribute "<necessary>" indicates an attribute changeable to the attribute "<optional>". The attribute "<optional>" indicates an attribute changeable to the attribute "<necessary>". Such a change in an attribute can be preset by the user on a selling screen (not illustrated) displayed on the operation panel 360 of the image formation apparatus 300. By accessing an information provision service that is provided by the server 200 or the image formation apparatus 300, such as a WEB page, from the client terminal 50, the above-described setting may be performed in the client terminal 50.

Setting of Execution Permission Confirmation According to Second Exemplary Embodiment FIG. 23B is a diagram illustrating a data table for a setting of execution permission confirmation for each job according to the second exemplary embodiment There are three types of setting values "confirm", "<confirm>", and "<omit>" as setting values settable for each job.

As in the first exemplary embodiment, the "confirm" is a setting for necessarily performing execution permission confirmation. An item for which "confirm" is input as a setting value cannot be changed from "confirm".

As in the first exemplary embodiment, the "<confirm>" is a setting for necessarily performing execution permission confirmation. An item for which "<confirm>" is input as a setting value can be changed to "<omit>".

The "<omit>" is a setting for allowing the omission of execution permission confirmation. An item for which "<omit>" is input as a setting value can be changed to "<confirm>". Such a change in a setting can be preset by the user on a setting screen (not illustrated) displayed on the operation panel 360 of the image formation apparatus 300. By accessing an information provision service that is provided by the server 200 or the image formation apparatus 300, such as a WEB page, from the client terminal 50, the above-described setting may be performed in the client terminal 50.

Description of Job Parameter According to Second Exemplary Embodiment

FIG. 23C is a diagram illustrating a data table of a default value of each job according to the second exemplary embodiment. For each item in FIG. 23C, default setting values of the corresponding items are registered. Among values registered for each item, data put in brackets, such as "<1>" and "<duplex>", indicate variable values. In contrast to this, data not put in brackets, such as "monochrome", indicates a fixed value. The registration of default values can be preset by the user on a setting screen (not illustrated) displayed on the operation panel 360 of the image formation apparatus 300. By accessing an information provision service that is provided by the server 200 or the image formation apparatus 300, such as a WEB page, from the client terminal 50, the above-described setting may be performed in the client terminal 50. The use of the data table is not limited to the process during a voice operation, and values in the data table can be used as default parameters in job execution. Alternatively, the data table may be managed as a data table applied only to the process during a voice operation.

In the present exemplary embodiment, unlike the first exemplary embodiment, default values can be registered for the destination item of "Store Operation", "Send Operation", and "Fax Operation". In accordance with the configuration, an attribute of the item "designation of destination" is made changeable between "<necessary>" and "<optional>". Examples of default values set for the destination item include "<BOX1>", "<none>", and "<Mr. Yamada>". The "<none>" indicates a state in which nothing is set although a default value can be input. If "<optional>" is set as an attribute of an item in a state in which a default value is "<none>", erroneous processing may be performed. For this reason, in the present exemplary embodiment, for an item for which "<none>" is set as a default value, processing of changing an attribute of the item to "<necessary>" is performed. For example, in FIG. 23A, "<necessary>" is set as the attribute of "designation of destination" of the Send Operation (send instruction), <Processing for Case of Omitting Job Execution Permission Confirmation>

Figure 18:
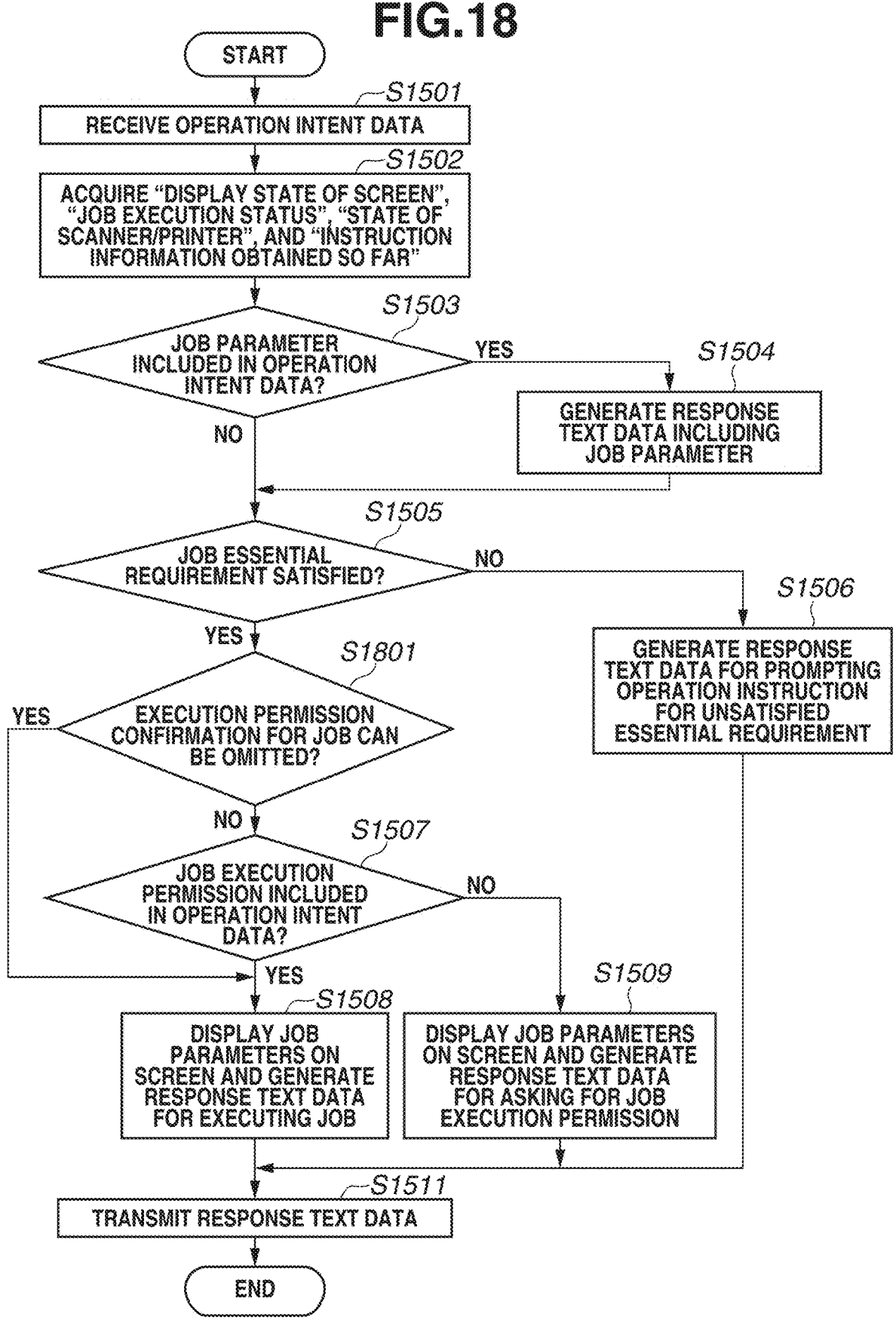
FIG. 18 is a flowchart illustrating partial processing of a control program of an image formation apparatus.

FIG. 18 is a flowchart illustrating the details of the process in step S1406 in FIG. 14 according to the second exemplary embodiment.

The control illustrated in this flowchart is executed by the controller unit 310. More specifically, the above-described control is implemented by the CPU 311 loading a program stored in the ROM 313, onto the RAM 312, and executing the program. The processing similar to the processing in FIG. 15 is assigned similar step numbers, and the description thereof will be omitted. The processing in FIG. 18 is different from the processing in FIG. 15 in that step S1801 is added.

After having passed through steps S1501 to S1504, in step S1505, the controller unit 310 determines whether an essential requirement of a job is satisfied. If an essential requirement of a job is unsatisfied (NO in step S1505), the controller unit 310 performs the operations in step S1506 and the subsequent steps as in FIG. 15. If an essential requirement of a job is satisfied (YES in step S1505), the controller unit 310 advances the processing to step S1801.

In step S1801, the controller unit 310 determines whether execution permission confirmation for the job can be omitted. The determination is made based on the setting input to the data table illustrated in FIG. 23B. If a setting other than "<omit>" is input for a job designated for which an execution instruction is issued, in the data table illustrated in FIG. 23B, execution permission confirmation for the job cannot be omitted. Thus, the controller unit 310 executes the processing in step S1507 and subsequent steps as in FIG. 15.

If "<omit>" is input for the job for which the execution instruction is issued in the data table illustrated in FIG. 23B, execution permission confirmation for the job can be omitted. Thus, the controller unit 310 advances the processing to step S1508. More specifically, the controller unit 310 skips the operation in step S1507, and executes the operation in step S1508. After that, the controller unit 310 executes the processing in step S1508 and subsequent steps as in FIG. 15.

Figure 19:
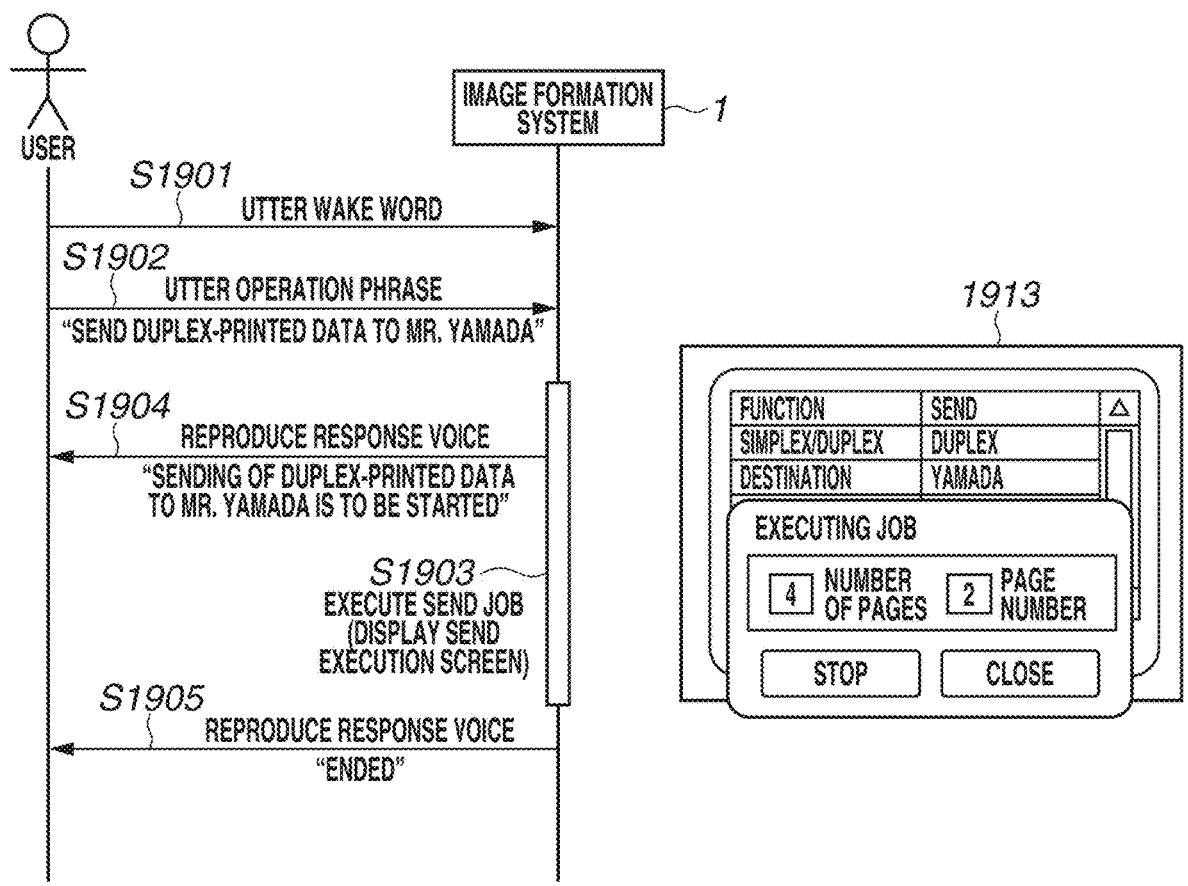
FIG. 19 is a sequence diagram illustrating an example of an operation which is performed between a system and a user.

Sequence Example C (FIG. 19) of Send Process According to Second Exemplary Embodiment FIG. 19 is a sequence diagram illustrating an example of a speech dialogue performed between the image processing system 1 and the user in a series of voice operations, and operations of the image processing system 1 that are performed during the operation.

In step S1901, the user utters a wake word to the image processing system 1. A series of voice operations is thus started.

In step S1902, the user utters a phrase relating to an operation that the user wants to perform using the image processing system 1, subsequently to the wake word. In this example, the user utters "send duplex-printed data to Mr. Yamada".

In step S1903, the image processing system 1 performs processing in accordance with the user utterance phrase received in step S1902. At this time, in response to the user utterance "send duplex-printed data to Mr. Yamada", the server 200 in the image processing system 1 generates the operation intent data illustrated in FIG. 13E, and transmits the generated operation intent data to the image formation apparatus 300. In response to receiving the operation intent data, the image formation apparatus 300 executes the processing illustrated in the processing in FIG. 18 once.

In step S1904, the image processing system 1 displays a screen 1913 including the job parameters, on the operation panel 360. A copy job is subsequently executed, and the image processing system 1 reproduces response voice "sending of duplex-printed data to Mr. Yamada is to be started".

After that, if the execution of the copy job ends in the image processing system 1, in step S1905, the image processing system 1 reproduces voice "ended", and ends the series of voice operations.

Processing of Control Program in Sequence Example C (FIG. According to Second Exemplary Embodiment In step S1903 in the sequence illustrated in FIG. 19, the operation intent data analysis unit 324 executes the processing in FIG. 18. In step S1903, the following processing of executing the processing in FIG. 18 is performed.

In step S1501, the controller unit 310 receives new information, {document duplex}, {to Yamada}, and {send}.

In step S1502, the controller unit 310 acquires information, {scan available} and {document set}.

In step S1503, the controller unit 310 determines that {document duplex}, {to Yamada}, and {send} being job parameters are included in the received data.

In step S1504, the controller unit 310 generates a response text message indicating that "send duplex-printed data to Mr. Yamada".

In step S1505, the controller unit 310 checks whether all the items "scan available", "designation of destination (destination)", and "document set" on the column of "send instruction" in FIG. 23A are satisfied in the information acquired in step S1502. The controller unit 310 determines that the essential items are satisfied.

In step S1801, the controller unit 310 confirms that "<omit>" is set on the column of "send instruction" in FIG. 23B, and determines that execution permission confirmation can be omitted.

In step S1508, the controller unit 310 instructs the operation panel 360 to display the screen 1913 including the job parameters, and issues an execution instruction for a send job. In step S1904, the controller unit 310 generates a response text message indicating that "a job is to be started".

Fields of "function" and "send" in the display of the screen 1913 in FIG. 19 indicate that the currently set job is a send job, and "Yamada" as "destination" indicates that a send destination is set to "Yamada". Furthermore, the fields of "duplex/simplex" and "duplex" indicate that the currently set job parameter is "document duplex".

Among a series of operation intents, a job parameter "color" is not designated. Nevertheless, not "monochrome" but "color" is used. This is because the job parameter in the row corresponding to "color" on the column of "send instruction" in FIG. 23C is data indicating "<color>", and a default value is accordingly used as recommended data.

In the fields of "duplex/simplex" and "duplex" in the display of the screen. 1913 in FIG. 19, job parameters "not put in brackets" are set. This indicates that the currently-set job parameter "document duplex" is not "<duplex>" as a default value but "duplex" designated by the user based on operation intent data. More specifically, a default setting value (recommended value) and a user-designated value are displayed in a distinguishable manner.

Figure 20:
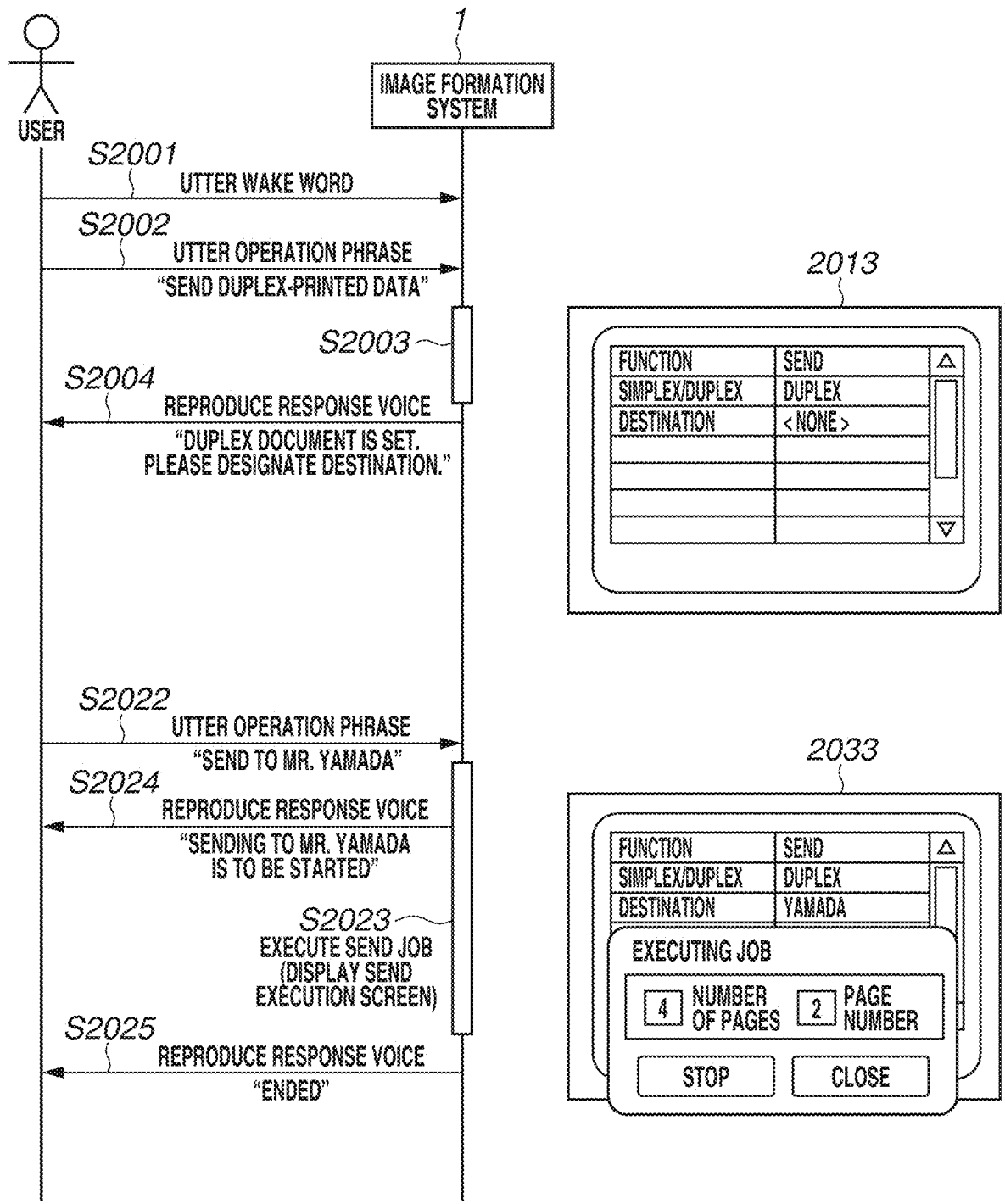
FIG. 20 is a sequence diagram illustrating an example of an operation which is performed between a system and a user.

Sequence Example D (FIG. 20) According to Second Exemplary Embodiment when Send Destination is Deficient FIG. 20 is a sequence diagram illustrating another example of a speech dialogue performed between the image processing system 1 and the user in a series of voice operations in the present exemplary embodiment, and operations of the image processing system 3 that are performed at the time.

In step S2001, the user utters a wake word to the image processing system 1. Thus, a series of voice operations is started.

In step S2002, the user utters a phrase relating to an operation that the user wants to perform using the image processing system 1, subsequently to the wake word. In this example, the user utters "send duplex-printed data".

In step S2003, the image processing system 1 performs processing in accordance with the user utterance phrase received in step S2002. At this time, in response to the user utterance "send duplex-printed data", the server 200 in the image processing system 1 generates the operation intent data illustrated in FIG. 13F, and transmits the generated operation intent data to the image formation apparatus 300. In response to receiving the operation intent data, the image formation apparatus 300 executes the processing illustrated in the flowchart in FIG. 18 once.

If the designation of a destination to be used for the send job is deficient, the image processing system 1 instructs the operation panel 360 to display a screen 2013 including the job parameters. In step S2004, the image processing system 1 reproduces response voice "a duplex document is to be set. Please designate a destination."

Fields of "function" and "send" in the display of the screen 2013 in FIG. 20 indicate that the currently set job is a send job. In addition, "<none>" as "destination" indicates that a send destination is unset and a default destination set as a default setting of a system is unregistered.

Subsequently, in step S2022, the user utters "send to Mr. Yamada".

In step S2023, the image processing system 1 performs processing in accordance with the user utterance phrase received in step S2022. The server 200 in the image processing system 1 generates the operation intent data illustrated in FIG. 13G, and transmits the generated operation intent data to the image formation apparatus 300. In response to receiving the operation intent data, the image formation apparatus 300 executes the processing illustrated in the flowchart in FIG. 18 again (second time). Consequently, in step S2023, the image processing system 1 displays a job parameter setting preference confirmation screen 2033 on the operation panel 360. The image processing system 1 executes a send job. In step S2024, the image processing system 1 reproduces response voice "sending to Mr. Yamada is to be started".

After that, if the execution of the send job ends, in step S2025, the image processing system 1 reproduces voice "ended", and ends the series of voice operations.

Processing of Control Program in Sequence Example D (FIG. 20) According to Second Exemplary Embodiment In step S2003, the operation intent data analysis unit 324 executes the processing of the flowchart in FIG. 18. After that, in step S2023, the operation intent data analysis unit 324 executes the processing of the flowchart in FIG. 18 again.

In the operation executed in step S2003, the following processing is performed.

In step S1501, the controller unit 310 receives new information, namely, {document duplex} and {send}.

In step S1502, the controller unit 310 acquires state information, namely, {scan available} and {document set}.

In steps S1503 and S1504, the controller unit 310 sets job parameters {document duplex} and {send} based on the received data. The controller unit 310 generates a response text message indicating that "a duplex document is to be set".

In step S1505, since the item "destination" on the column of "send instruction" in FIG. 23A is unsatisfied, the controller unit 310 determines that an essential item is unsatisfied (NO in step S1505).

In step S1506, the controller unit 310 instructs the operation panel 360 to display the screen 2013 including the job parameters. The controller unit 310 generates a response text message indicating that "please set a destination". Furthermore, the controller unit 310 generates dialogue session continuance information and stores information, {document duplex} and {send}.

In the processing in step S2023 for the second time, the following processing is performed.

First of all, in step S1501, the controller unit 310 receives new information, namely, {Yamada} and sendγ.

In step S1502, the controller unit 310 acquires information, namely, {scan available}, {document set}, {document duplex}, and {send}.

In steps S1503 and S1504, the controller unit 310 newly sets a newly-received job parameter Yamada to a destination, and overwrites "instruction information obtained so far" with {send}. The controller unit 310 generates a response text message indicating that "send to Mr. Yamada".

In step S1505, the controller unit 310 checks whether all the items "scan available", "destination", and "document set" on the column of "send instruction" in FIG. 23A are satisfied in the information acquired in step S1502. The controller unit 310 determines that essential items are satisfied (YES in step S1505).

In step S1801, the controller unit 310 checks that "<omit>" is set on the column of "send instruction" in FIG. 23B, and determines that execution permission confirmation can be omitted.

In step S1508, the controller unit 310 instructs the operation panel 360 to display the job parameter setting preference confirmation screen 2033 including the job parameters, and issues an execution instruction for the send job. In step S2024, the controller unit 310 generates a response text message indicating that "sending is to be started."

Figure 21:
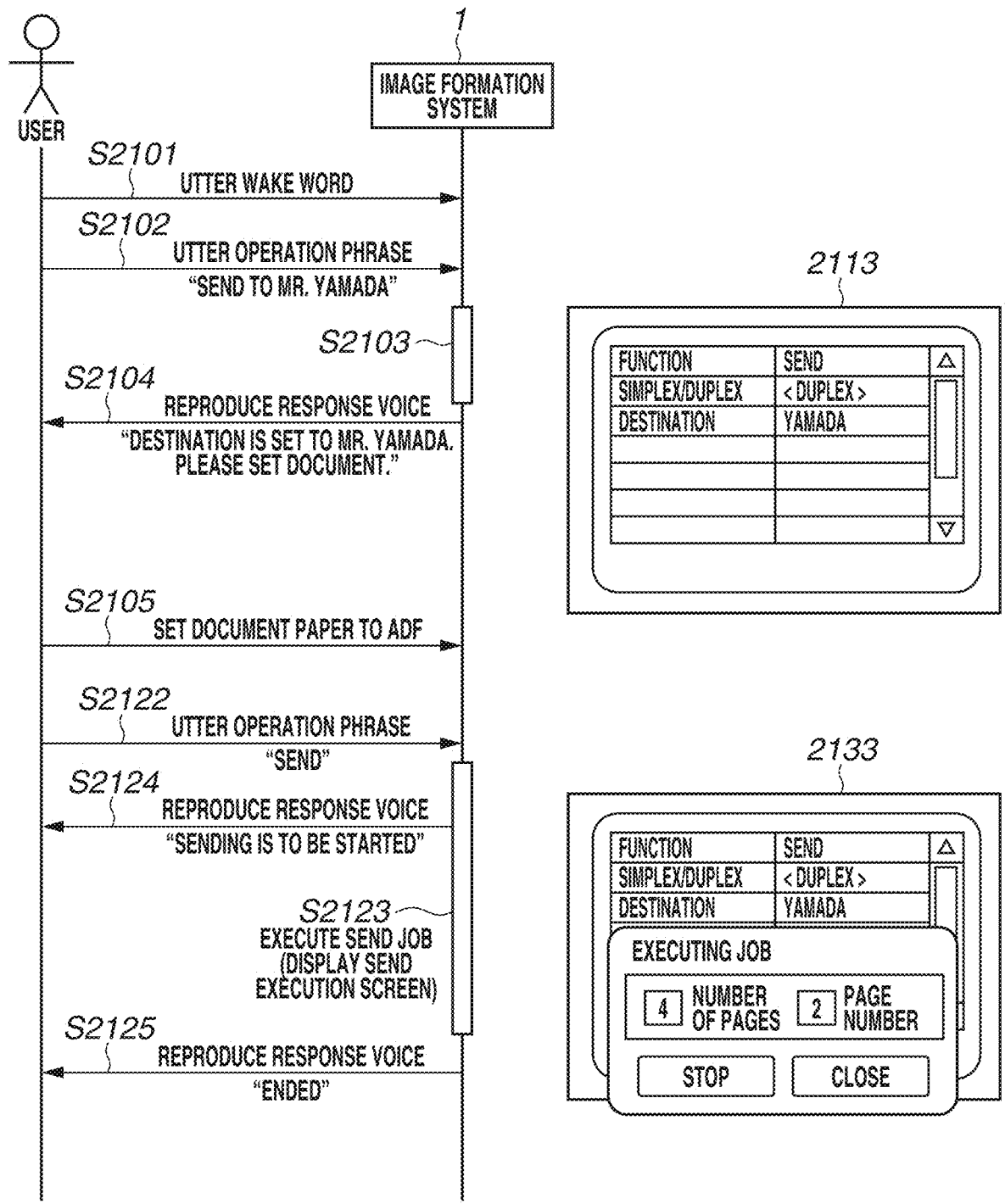
FIG. 21 is a sequence diagram illustrating an example of an operation which is performed between a system and a user.

Sequence Example E (FIG. 21) According to Second Exemplary Embodiment when Send Document Set is Unsatisfied FIG. 21 is a sequence diagram illustrating another example of a speech dialogue performed between the image processing system 1 and the user in a series of voice operations in the present exemplary embodiment, and operations of the image processing system 1 that are performed at the time.

Initially, in step S2101, the user utters a wake word to the image processing system 1. Thus, a series of voice operations is started.

In step S2102, the user speaks a phrase relating to an operation that the user wants to perform using the image processing system 1, subsequently to the wake word. In this example, the user utters "send to Mr. Yamada".

In step S2103, the image processing system 1 performs processing in accordance with the user utterance phrase received in step S2102. At this time, in response to the user utterance "send to Mr. Yamada", the server 200 in the image processing system 1 generates the operation intent data illustrated in FIG. 13G, and transmits the generated operation intent data to the image formation apparatus 300. In response to receiving the operation intent data, the image formation apparatus 300 executes the processing illustrated in the flowchart in FIG. 18 once.

If prepared document sheets that are to be used for the send job, such as paper in an automatic document feeder (ADF) tray, are insufficient, the image processing system 1 instructs the operation panel 360 to display a screen 2113 including the job parameters. In step S2104, the image processing system 1 reproduces response voice "destination is set to Mr. Yamada. Please set a document."

In step S2105, the user sets document sheets in an ADF tray. Subsequently, in step S2122, the user utters "send".

In step S2123, the image processing system 1 performs processing in accordance with the user utterance phrase received in step S2122, The server 200 in the image processing system 1 generates the operation intent data illustrated in FIG. 13D, and transmits the generated operation intent data to the image formation apparatus 300. In response to receiving the operation intent data, the image formation apparatus 300 executes the processing illustrated in the flowchart in FIG. 18 again (second time). Consequently, in step S2123, the image processing system 1 displays a job parameter setting preference confirmation screen 2133 on the operation panel 360, and executes the send job. In step S2144, the image processing system 1 reproduces response voice "sending is to be started".

After that, if the execution of the send job ends, in step S2125, the image processing system 1 reproduces voice "ended", and ends the series of voice operations.

Processing of Control Program in Sequence Example F (FIG. 21) According to Second Exemplary Embodiment In step S2103, the operation intent data analysis unit 324 executes the flowchart in FIG. 18. After that, in step S2123, the operation intent data analysis unit 324 executes the flowchart in FIG. 18 again.

In the processing in step S2103 to be performed for the first time, the following processing is performed.

In step S1501, the controller unit 310 receives new information, namely, {Yamada} and {send}.

In step S1502, the controller unit 310 acquires state information, namely, {scan available} and "document sheets are not set in an ADF tray".

In steps S1503 and S1504, the controller unit 310 sets job parameters {Yamada} and {send} based on the received data, and generates a response text message indicating that "destination is set to Mr. Yamada."

In step S1505, since the item "document set" on the column of "send instruction" in FIG. 23A is unsatisfied, the controller unit 310 determines that an essential item is unsatisfied (NO in step S1505).

In step S1506, the controller unit 310 instructs the operation panel 360 to display the screen 2113 including the job parameters, and generates a response text message indicating that "please set a document". Furthermore, the controller unit 310 generates dialogue session continuance information, and stores information of {Yamada} and {send}.

In the processing in step S2123 for the second time, the following processing is performed.

In step S1501, the controller unit 310 receives new information, namely, {send}.

In step S1502, the controller unit 310 acquires information, namely, {scan available} and {document set} to the ADF tray.

In steps S1503 and S1504, the controller unit 310 overwrites "instruction information obtained so far" with the newly-received job parameter {send}. The controller unit 310 generates a response text message indicating "send".

In step S1505, the controller unit 310 checks whether all the items "scan available", "destination", and "document set" on the column of "send instruction" in FIG. 23A are satisfied in the information acquired in step S1802. The controller unit 310 determines that essential items are satisfied (YES in step S1505).

In step S1801, the controller unit 310 checks that "<omit>" is set on the column of "send instruction" in FIG. 23B, and determines that execution permission confirmation can be omitted.

In step S1508, the controller unit 310 instructs the operation panel 360 to display the job parameter setting preference confirmation screen 2133 including the job parameters, and issues an execution instruction for the send job. In step S2124, the controller unit 310 generates a response text message indicating that "sending is to be started."

<Remarks>

As described above, according to the second exemplary embodiment, execution permission confirmation before job execution can be omitted. This can prevent an amount of the utterance of the image processing system 1 and the number of dialogues performed between the image processing system 1 and the user from becoming redundant.

According to the second exemplary embodiment, whether to perform execution permission confirmation before a job execution start can be varied for each job type.

According to the second exemplary embodiment, for at least partial job parameter items, the user can preliminarily designate which of the attribute "<necessary>" and the attribute "<optional>" is to be set.

According to the second exemplary embodiment, the user can preset whether to perform execution permission confirmation before a job execution start.

According to the second exemplary embodiment, the user can preset default values for a voice operation. Thus, the voice designation for partial job parameters can be omitted.

OTHER EXEMPLARY EMBODIMENTS

While examples of the copy job and the send job have been described in the first and second exemplary embodiments, the present invention can also be applied to other functions (printer, FAX transmission, document file processing, full color/monochrome color designation processing, optical character reader (OCR) processing) of the MFP, as illustrated in the data tables in FIGS. 22A, 22B, 22C, 23A, 23B, and 23C. The present invention may be applied to a post-processing function (stapling, folding, cutting/bookbinding) of a printer job function. The present invention may be applied to a document data management function job (user authentication, storage authentication, network authentication, push scan (upload) to network storage service or pull print (download) therefrom).

In the first and second exemplary embodiments, device states and job settings are collectively represented as execution essential requirements of jobs. Herein, the device states include scan available, print available, print sheet, FAX line, document set, storage authentication, and network authentication. The job settings include designation of the number of copies, designation of print duplex, designation of document duplex, designation of destination, and designation of color. Requirements may be divided into a plurality of attributes, such as "essential device states" and "essential job settings".

<Automatic Send by Supplementing Destination>

The description has been provided of an example in which, in step S1904 in FIG. 19 of the sequence example C, the image processing system 1 utters "sending of duplex-printed data to Mr. Yamada is to be started". The item "duplex" does not have the attribute "<necessary>", and thus, the image processing system 1 may utter "sending to Mr. Yamada is to be started" in which "duplex" is omitted.

The description has been provided of an example in which, in step S2022 in FIG. 20 of the sequence example D, in response to the essential job parameter "destination" of the send job being unsatisfied, the send job is executed by uttering "send to Yamada". Alternatively, if the user utters "to Mr. Yamada, send", the execution of the send job may be started at the time point at which the user utters up to "to Mr. Yamada", because the essential item is satisfied.

The description has been provided of an example in which, in step S2122 in FIG. 21 of the sequence example E, in response to the essential job parameter "document set" of the send job being unsatisfied, the send job is executed by speaking "send" after setting the document. In another embodiment, the execution of the send job may be started at the time point at which the setting of the document is detected, because the essential item is satisfied.

<Confirmation Setting of Execution Permission>

In the first exemplary embodiment, the description has been provided of the configuration in which execution permission confirmation settings of all the job types are unchangeable. In the second exemplary embodiment, the description has been provided of the configuration in which execution permission confirmation settings of all the job types are changeable. In another embodiment, confirmation settings of partial job types may be made changeable and confirmation settings of the other job types may be made unchangeable. For example, an execution permission confirmation setting of only the FAX function may be fixed to "confirm".

<Execution Essential Requirement of Job>

In the first exemplary embodiment, the description has been provided of the configuration in which an attribute of a job parameter that is not set to "unnecessary" is fixed to either "optional" or "necessary". In the second exemplary embodiment, the description has been provided of the configuration in which an attribute of a job parameter that is not set to "unnecessary" is made variable between "<optional>" and "<necessary>". In another embodiment, an attribute of only partial items of job parameters (excluding "unnecessary") may be made variable and attributes of other items may be fixed. For example, while an attribute of "designation of destination" of Send Operation is made variable between "<optional>" and "<necessary>", an attribute of "designation of destination" of Fax Operation may be fixed to "necessary".

<Automatic Change of Default Value>

In the second exemplary embodiment, the description has been provided based on the premise that the user preregisters default values in the data table illustrated in FIG. 23C. In another embodiment, the default values may be made automatically changeable by an apparatus.

For example, if almost the same number of jobs among a plurality of jobs alternately use "simplex copy" and "duplex copy", default settings of copy job parameters "simplex/duplex" and "<duplex>" may be automatically changed to "<none>".

For example, if 20 or more send jobs are consecutively performed with "send to Yamada", default settings of send job parameters may be automatically changed to "destination" and "<Yamada>".

<Combination with Touch Operation>

In the first and second exemplary embodiments, the description has been provided of the case of performing a setting and an instruction for a job only by an utterance operation. Alternatively, a partial operation may be replaced with a touch operation.

For example, as a user operation following "A duplex document is set. Please designate a designation" in step S2004, the user may touch a portion corresponding to "destination" or "<none>" displayed on an operation panel to display a destination list, and select a destination from the list.

Control Example of Omitting Utterance when Wording is Changed

In the second exemplary embodiment, the description has been provided of a case where the image processing system 1 makes a voice response "sending of duplex-printed data to Yamada is to be started" in step S1904. In another embodiment, a response wording used by the image processing system 1 may be another wording. A response text message may be generated based on a preliminarily-made setting or a sentence construction of the last utterance of the user. As an utterance to be used for a voice response, a wording resembling the utterance of the user may be employed. For example, a sentence may be separated, such as "Duplex is set. A send destination is set to Yamada. Sending is to be started."

In the first and second exemplary embodiments, the description has been provided of an example in which the image processing system 1 does not utter job name information by voice utterance. In another embodiment, a response text message may include a specific job name, or may include a common address term, such as "job". Such an address term needs not necessarily be generated. For example, "is this setting OK?" uttered in steps S1604 and S1724 in FIGS. 16, 17, 19, and 20 may be "is this copy setting OK?". As another example, "a job is to be started" in steps S1624 and S1744 may be "copy is to be started" or "to be started". As another example, "sending is to be started" in steps S1924, S2024, and S2114 may be "job is to be started" or "to be started".

In addition, "ended" in steps S1625 and S1725 may be "the job has ended" or "copy has ended". In another example, "ended" in steps S1905, S2005, and S2105 may be "the job has ended" or "sending has ended."

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-223303, filed Dec. 10, 2019, which is hereby incorporated by reference herein in its entirety.

What is claimed is:

1. An image processing system comprising:
   an image processing device configured to process an image;
   a microphone configured to acquire sound;
   a speaker configured to output audio information;
   a display configured to display information; and
   one or more processors configured to acquire text information based on voice information acquired via the microphone;
      in a case where the text information includes at least an execution command of a predetermined image processing, cause the image processing device to execute the predetermined image processing, the display to display a screen for confirmation of a setting command while the predetermined image processing is executed, and the speaker to output audio information including a portion of the setting command displayed on the screen for confirmation of the setting command;
      in a case where the text information includes the setting command of the predetermined image processing and does not include the execution command cause the display to display a screen for waiting for the execution command,
      wherein the screen for waiting for the execution command includes information for confirming the setting command; and
      cause the speaker to output the audio information including a portion of the setting command displayed on the screen for waiting for the execution command, and output audio guidance confirming execution of the predetermined image processing based on the setting command displayed on the screen for waiting for the execution command.

2. The image processing system according to claim 1, wherein the one or more processors are further configured to cause the speaker to output announcement related to execution of the predetermined image processing, with execution of the predetermined image processing performed by the image processing device.

3. The image processing system according to claim 1, wherein the one or more processors are further configured to cause the speaker to output announcement for confirming execution of the predetermined image processing, with the screen for waiting for the execution instruction being displayed on the display.

4. The image processing system according to claim 1, wherein the voice information is information acquired by one utterance of a user.

5. The image processing system according to claim 1, wherein the one or more processors is configured to acquire text information using at least a trained model obtained through learning based on training data including a pair of text information and voice information.

6. The image processing system according to claim 1, wherein the one or more processors are further configured to acquire additional text information based on additional voice information acquired via the microphone; and
   cause the image processing device to execute the predetermined image processing in response to an execution command being acquired from the additional text information in a state in which the screen for waiting for the execution instruction is displayed on the display.

7. The image processing system according to claim 1, wherein the image processing device is a reading device configured to read an image from a document, and
   wherein the image processing includes reading an image by using the reading device.

8. The image processing system according to claim 7, wherein the predetermined image processing includes storing an image read by the reading device, into a storage.

9. The image processing system according to claim 7, wherein the predetermined image processing includes uploading an image read by the reading device, to a network storage service.

10. The image processing system according to claim 7, wherein the predetermined image processing includes transmitting an image read by the reading device, by an electronic mail.

11. The image processing system according to claim 7, wherein the predetermined image processing includes transmitting an image read by the reading device, by facsimile.

12. The image processing system according to claim 7, further comprising an image formation device configured to form an image onto a sheet,
   wherein the predetermined image processing includes causing an image formation device to execute image formation that is based on an image read by the reading device.

13. The image processing system according to claim 1, wherein the image processing device is an image formation device configured to form an image onto a sheet, and
   wherein the predetermined image processing causes the image formation device to execute image formation that is based on an image designated by a user.

14. The image processing system according to claim 1, further comprising an apparatus including the image processing device, the microphone, and the display.

15. The image processing system according to claim 1, further comprising:
   an apparatus including the image processing device and the display; and
   an apparatus including the microphone.

16. The image processing system according to claim 1, further comprising:
   an apparatus including the image processing device; and
   an apparatus including the microphone and the display.

17. The image processing system according to claim 1, wherein the one or more processors are further configured to cause the speaker to output the audio guidance confirming the execution of the predetermined image processing based on the setting command displayed on the screen and not to output audio information about the setting command displayed on the screen.

18. An image processing apparatus comprising:
   an image processing device configured to process an image;
   a speaker configured to output audio information;
   a microphone configured to acquire sound;
   a display configured to display information; and
   one or more processors configured to:
      acquire text information based on voice information acquired via the microphone;
      in a case where the text information includes at least an execution command of a predetermined image processing, cause the image processing device to execute the predetermined image processing, the display to display a screen for confirmation of a setting command while the predetermined image processing is executed, and the speaker to output audio information including a portion of the setting command displayed on the screen for confirmation of the setting command;

in a case where the text information includes the setting command of the predetermined image processing and does not include the execution command, cause the display to display a screen for waiting for the execution command, wherein the screen for waiting for the execution command includes information for confirming the setting command; and cause the speaker to output the audio information including a portion of the setting command displayed on the screen for waiting for the execution command, and output audio guidance confirming execution of the predetermined image processing based on the setting command displayed on the screen for waiting for the execution command.

19. An image processing method comprising:

acquiring text information based on voice information acquired via a microphone;

in a case where the text information includes at least an execution command of a predetermined image processing, causing an image processing device to execute the predetermined image processing and to display a screen for confirmation of the setting command while the predetermined image processing is executed;

in a case where the text information includes the setting command of the predetermined image processing and does not include the execution command, causing a display to display a screen for waiting for the execution command, wherein the screen for waiting for the execution command includes information for confirming the setting command, and causing a speaker to output audio information including a portion of the setting command displayed on the screen for waiting for the execution command, and output audio guidance confirming execution of the predetermine image processing based on the setting command displayed on the screen for waiting for the execution command.

\* \* \* \* \*